United States Patent
Lee et al.

(10) Patent No.: US 9,977,529 B2
(45) Date of Patent: May 22, 2018

(54) METHOD FOR SWITCHING DIGITIZER MODE

(71) Applicant: Samsung Electronics Co., Ltd., Suwon-si, Gyeonggi-do (KR)

(72) Inventors: Joo-Hoon Lee, Suwon-si (KR); Sung-Ha Park, Suwon-si (KR); Jin-Hong Jeong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 108 days.

(21) Appl. No.: 14/313,208

(22) Filed: Jun. 24, 2014

(65) Prior Publication Data

US 2015/0002425 A1     Jan. 1, 2015

(30) Foreign Application Priority Data

Jul. 1, 2013 (KR) .................. 10-2013-0076743

(51) Int. Cl.
| | | |
|---|---|---|
| *G06F 3/041* | (2006.01) | |
| *G06F 3/038* | (2013.01) | |
| *G06F 3/0354* | (2013.01) | |
| *G06F 3/046* | (2006.01) | |
| *G06F 3/044* | (2006.01) | |

(52) U.S. Cl.
CPC .......... *G06F 3/0416* (2013.01); *G06F 3/0383* (2013.01); *G06F 3/03545* (2013.01); *G06F 3/044* (2013.01); *G06F 3/046* (2013.01); *G06F 2203/04106* (2013.01)

(58) Field of Classification Search
CPC .... G06F 3/0416; G06F 3/046; G06F 3/03545; G06F 3/0383; G06F 2203/04106
See application file for complete search history.

(56) References Cited

U.S. PATENT DOCUMENTS

| | | | | |
|---|---|---|---|---|
| 5,396,443 A | * | 3/1995 | Mese .................... | G06F 1/3215 713/321 |
| 5,444,192 A | * | 8/1995 | Shetye et al. ............. | 178/18.09 |
| 5,568,409 A | * | 10/1996 | Neoh .................... | G06F 1/3215 178/18.05 |
| 7,474,300 B2 | * | 1/2009 | Katsurahira .......... | G06F 1/3203 178/18.01 |
| 7,612,767 B1 | | 11/2009 | Griffin et al. | |

(Continued)

FOREIGN PATENT DOCUMENTS

| | | |
|---|---|---|
| CN | 102981659 A | 3/2013 |
| EP | 0 306 063 B1 | 8/1994 |

(Continued)

OTHER PUBLICATIONS

Machine translation of KR1020120056465; Sang-Hwan Oh.*
Chinese Office Action dated Feb. 11, 2018, issued in Chinese Patent Application No. 201410310462.3.

*Primary Examiner* — Mihir K Rayan
(74) *Attorney, Agent, or Firm* — Jefferson IP Law, LLP

(57) ABSTRACT

A method and a user device for controlling a mode of a digitizer are provided. The method and the user device includes detecting an input unit by scanning the digitizer, measuring at least one parameter corresponding to the input unit, and controlling switching of the digitizer to a mode according to a result of the measurement of the at least one parameter.

27 Claims, 13 Drawing Sheets

(56) References Cited

U.S. PATENT DOCUMENTS

| | | |
|---|---|---|
| 7,847,789 B2* | 12/2010 | Kolmykov-Zotov .............. G06F 3/03545 178/18.03 |
| 9,024,893 B2* | 5/2015 | Chu ..................... G06F 3/0416 345/173 |
| 2006/0012580 A1* | 1/2006 | Perski ..................... G06F 3/038 345/173 |
| 2006/0123354 A1 | 6/2006 | Volovitz |
| 2007/0085836 A1* | 4/2007 | Ely ..................... G06F 3/03545 345/173 |
| 2008/0088487 A1 | 4/2008 | Li |
| 2008/0150917 A1* | 6/2008 | Libbey ..................... G06F 3/046 345/179 |
| 2009/0065269 A1 | 3/2009 | Katsurahira |
| 2009/0139780 A1 | 6/2009 | Katsurahira et al. |
| 2010/0252335 A1 | 10/2010 | Orsley |
| 2010/0328259 A1* | 12/2010 | Ishizaki ................. G06F 3/044 345/174 |
| 2011/0025635 A1* | 2/2011 | Lee .............................. 345/173 |
| 2012/0262418 A1 | 10/2012 | Lee |
| 2013/0057491 A1* | 3/2013 | Chu et al. ..................... 345/173 |
| 2013/0207938 A1* | 8/2013 | Ryshtun ................ G06F 3/0416 345/179 |
| 2014/0075178 A1* | 3/2014 | Trethewey ............ G06F 1/3206 713/100 |
| 2014/0104188 A1* | 4/2014 | Bakken et al. ................ 345/173 |
| 2014/0146021 A1* | 5/2014 | Trethewey ............ G06F 3/0488 345/179 |
| 2014/0267184 A1* | 9/2014 | Bathiche ............. G06F 3/03545 345/179 |

FOREIGN PATENT DOCUMENTS

| | | | |
|---|---|---|---|
| EP | 0 911 720 A1 | 4/1999 | |
| EP | 2 568 359 A2 | 3/2013 | |
| KR | 10-2009-002672 A | 3/2009 | |
| KR | 10-2009-0026728 A | 3/2009 | |
| KR | 1020120056465 | * 4/2012 | ............... G06F 1/32 |

* cited by examiner

METHOD FOR SWITCHING DIGITIZER MODE

CROSS-REFERENCE TO RELATED APPLICATION(S)

This application claims the benefit under 35 U.S.C. § 119(a) of a Korean patent application filed on Jul. 1, 2013 in the Korean Intellectual Property Office and assigned Serial number 10-2013-0076743, the entire disclosure of which is hereby incorporated by reference.

TECHNICAL FIELD

The present disclosure relates to a digitizer. More particularly, the present disclosure relates to a digitizer that supports various digitizer modes by means of an input unit, and a portable user device and a method using the digitizer.

BACKGROUND

Recently, portable user devices have provided more and more services and additional functions to users. A variety of applications are under development for execution in the portable user devices in order to increase the utilization of portable user devices and to satisfy various users' demands.

At least a few to hundreds of applications can be stored in a mobile, portable user device equipped with a touch screen, such as a smart phone, a portable phone, a laptop Personal Computer (PC), or a tablet PC, and a plurality of applications can be displayed on the touch screen of the portable user device. The portable user device and the applications associated therewith can be controlled by a touch or hovering of an input unit such as a finger, an electronic pen, a stylus pen, and/or the like.

If current flows through a coil of a digitizer, energy is transferred to an input unit having an electromagnetic resonant circuit. When current is blocked from the coil, a sensor of the digitizer measures the remaining resonation-induced voltage of the resonant circuit of the input unit and detects the input unit based on the measurement result. The portable user device and an application may be controlled according to the detecting result. Input units can be classified into a passive type and a digital type according to the method or mechanism by which the portable user device detects the input units.

A passive input unit includes passive devices such as an inductor (L), a Capacitor (C), and a Resistor (R). The passive input unit is generally configured to include only passive devices and operates with low power. Because the passive input unit does not require a battery, the passive unit is cost-effective, made small, and semi-permanent. However, the resonant frequency of the passive input unit may be changed due to a nearby magnetic material or conductive material that affects the resonant frequency, thereby imposing limitations on measuring pressure. In contrast, a digital input unit may include an Integrated Circuit (IC). Because the digital input unit measures a pressure and provides a digital pressure measurement to the digitizer, the digital input unit may not be sensitive to an external resonant frequency (e.g., the digital input unit may not be as sensitive to an external resonant frequency as a passive input unit). Further, the digital input unit may store input information (e.g., a pressure, a button input, erasure, and/or the like) applied by the input unit. However, the digital input unit requires power to drive the IC. Although the portable user device may supply power to the digital input device, the digital input device consumes much power, relative to the passive input device. If an additional power source is installed in the digital input device, the cost and size of the digital input device are increased. The digital input unit may conduct data communication usually in more slots than the passive input unit, thereby increasing the power consumption of the portable user device. An input unit may be implemented using various technologies, including, Electro-Magnetic Resonance (EMR), ultrasonic wave detection, optical detection, surface acoustic wave detection, and/or the like. Among the above identified technologies for implementing the input unit, the EMR scheme is widely used. In the EMR scheme, a substrate including a plurality of coils is used in a digitizer. When the input unit moves on or above the substrate, an electromagnetic field is changed. The changed electromagnetic field induces a signal to a coil and the digitizer detects the position of the input unit based on the induced signal.

The passive input unit and the digital input unit have various respective advantages and disadvantages. Although the digital input unit can provide an accurate pen pressure and can provide various use experiences through IC control, the digital input unit consumes much power, relative to the passive input unit. As a result, the digital input unit should require an additional power source or receive more power from a portable user device. In contrast, the passive input unit can operate even with a relatively low power received from a portable user device, without the need for using an additional power source. However, the passive input unit has limitations associated with transferring accurate information through a digital IC or providing a variety of use experiences.

Accordingly, there exists a need for increasing energy efficiency and user convenience by providing a method for switching the mode of a digitizer so as to take the advantages of various input units.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable user device and method for controlling a mode of a touch screen using an input unit.

In accordance with an aspect of the present disclosure, a method for controlling a mode of a digitizer in a user device is provided. The method includes detecting an input unit by scanning the digitizer, measuring at least one parameter corresponding to the input unit, and controlling switching of the digitizer to a mode according to a result of the measurement of the at least one parameter.

In accordance with an aspect of the present disclosure, the at least one parameter may be compared with a threshold and the digitizer is switched to at least one of a passive mode and a digital mode according to a result of the comparison.

In accordance with an aspect of the present disclosure, the type of the input unit may be determined based on the at least one parameter.

In accordance with an aspect of the present disclosure, the input unit may include an input unit without an Integrated Circuit (IC), an input unit with an IC, an input unit with an IC and a memory, an input unit with a short-range communication unit, an input unit that reads text, and a joy stick.

In accordance with another aspect of the present disclosure, a user device for controlling a mode of a digitizer is provided. The user device includes the digitizer, and a controller configured to detect an input unit by scanning the digitizer, to measure at least one parameter corresponding to the input unit, and to control switching of the digitizer to a mode according to a result of the measurement of the at least one parameter.

In accordance with an aspect of the present disclosure, if a voltage at a position of the input unit is smaller than a predetermined voltage threshold or a distance to the input unit is larger than a predetermined distance threshold, the digitizer may be switched to a passive mode. If the voltage at the position of the input unit is equal to or larger than the predetermined voltage threshold or the distance to the input unit is equal to or smaller than the predetermined distance threshold, the digitizer may be switched to a digital mode.

In accordance with an aspect of the present disclosure, if the digitizer is switched to a digital mode according to the input unit, the controller may determine whether the input unit has a battery by analyzing a feedback signal received from the input unit and may switch the digitizer to a passive digital mode or an active digital mode according to the presence or absence of the battery.

In accordance with another aspect of the present disclosure, a method for controlling a mode of a digitizer in a user device is provided. The method includes receiving a signal from an input unit having a communication function, determining an operation mode of the digitizer based on the received signal, and communicating with the input unit in the determined operation mode of the digitizer.

In accordance with an aspect of the present disclosure, operations modes of the digitizer may include a first mode of conducting short-range communication with the input unit, a second mode of performing the first mode and detecting at least one of a touch and a hovering of the input unit, and a third mode of detecting at least one of a touch and a hovering of the input unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
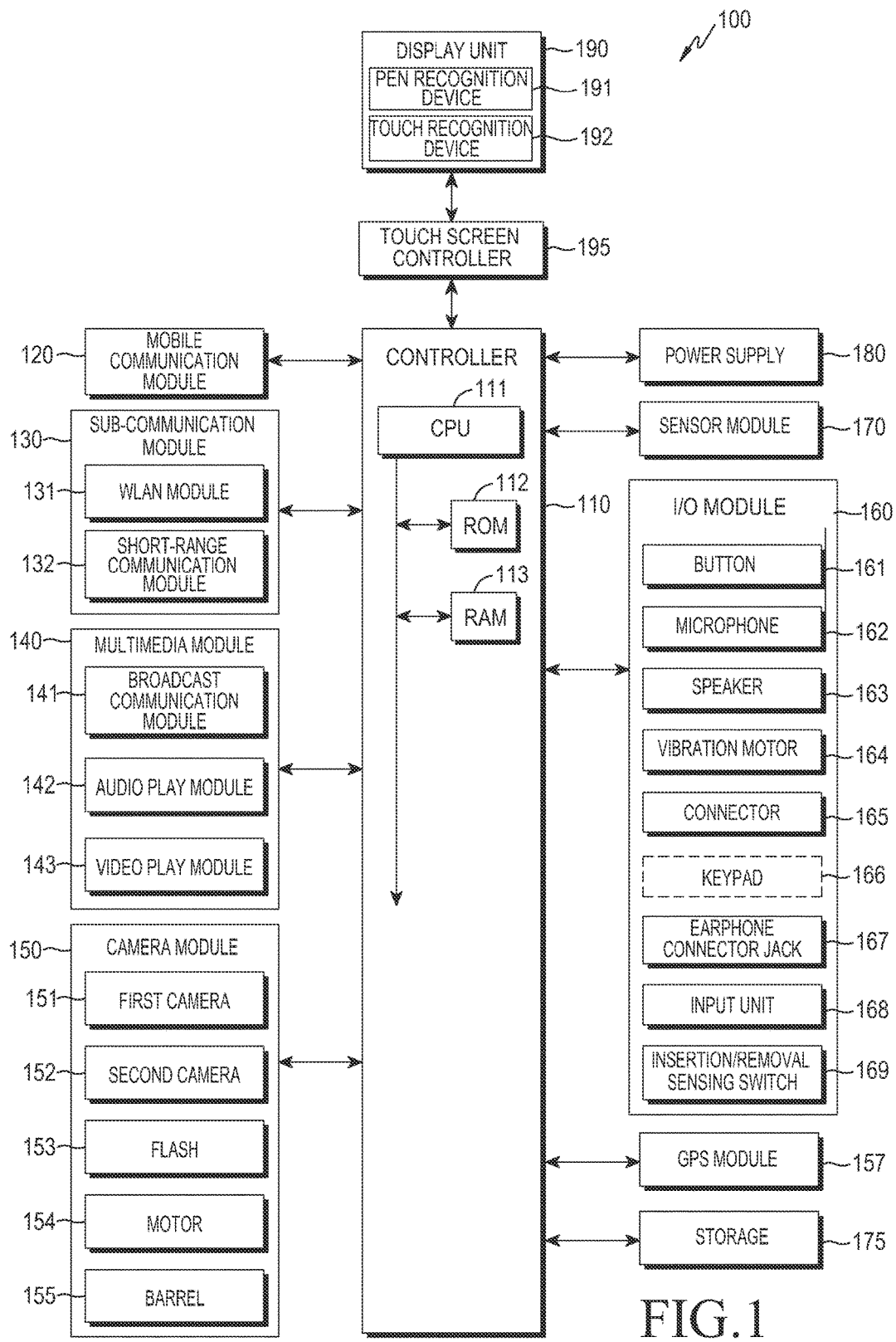
FIG. 1 is a block diagram of a user device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, and the like can be used to describe a number of components, such components are not limited by the terms. The terms are used to distinguish one component from other components. For example, a first component may be referred to as a second component or vice versa within the scope and spirit of the present disclosure. The term 'and/or' means inclusion of a combination of a plurality of described associated items or one of the items.

The technical terms used herein are provided simply to describe specific various embodiments, not intended to restrict the present disclosure. Herein, singular expressions include plural expressions unless otherwise clarified in the context. In this description, the term 'include' or 'have' is not interpreted as necessarily including all of the features, numbers, operations, components, parts, or a combination thereof described in the specification. Rather, it should be understood that there are possibilities of omitting or adding one or more features, numbers, operations, components, parts, or combinations thereof.

Unless otherwise defined, all the terms used herein including technical or scientific terms have the same meanings as terms generally understood by those skilled in the art. In addition, terms defined in a general dictionary should be understood so as to have the same meanings as contextual meanings of the related art. Unless definitely defined herein, the terms should not be interpreted as ideal or excessively formal meanings.

Terms used in various embodiments of the present disclosure are defined as follows.

User device: a mobile terminal that can transmit and receive data and conduct voice calls and video calls. The user device may include at least one digitizer. The user device may be any of a smart phone, a tablet Personal Computer (PC), a three-dimensional TeleVision (3D TV), a smart TV, a Light Emitting Diode (LED) TV, a Liquid Crystal Display (LCD) TV, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), a gaming console, an electronic dictionary, an electronic key, a camcorder, an electronic picture frame, a navigation device, a Global Positioning System (GPS) receiver, and the like. The user device may also be any device that can communicate with a peripheral device or another remote terminal. According to various embodiments of the present disclosure, a user device may be any combination of the foregoing devices. In addition, it will be apparent to one having ordinary skill in the art that a user device according to various embodiments of the present disclosure is not limited to the foregoing devices.

Input unit: at least one of a finger, an electronic pen, a digital pen, a pen without an Integrated Circuit (IC), a pen with an IC, a pen with an IC and a memory, a pen capable of short-range communication, a pen with an additional ultrasonic detector, a pen with an optical sensor, a joy stick, a stylus pen, and the like which can provide a command or an input to a user device by touching a digitizer or by hovering above the digitizer in a non-contact manner (e.g., a hovering event).

Object: displayed or displayable on a screen of a user device. The object may include at least one of an application, a Graphical User Interface (GUI), text, a widget, a photo, a map, a video, an email, a Short Message Service (SMS) message, a Multimedia Messaging Service (MMS) message, an e-book, and/or the like. The object may be executed, deleted, canceled, stored, and edited by an input unit. The term 'object' may include a short icon, a thumbnail image, a folder that stores at least one object in a user device, and/or the like.

FIG. 1 is a block diagram of a user device according to various embodiments of the present disclosure.

Referring to FIG. 1, a user device 100 may include a controller 110, a mobile communication module 120, a sub-communication module 130, a multimedia module 140, a camera module 150, a Global Positioning System (GPS) module 157, an Input/Output (I/O) module 160, a sensor module 170, a memory 175, a power supply 180, at least one touch screen 190, and at least one touch screen controller 195.

Figure 3:
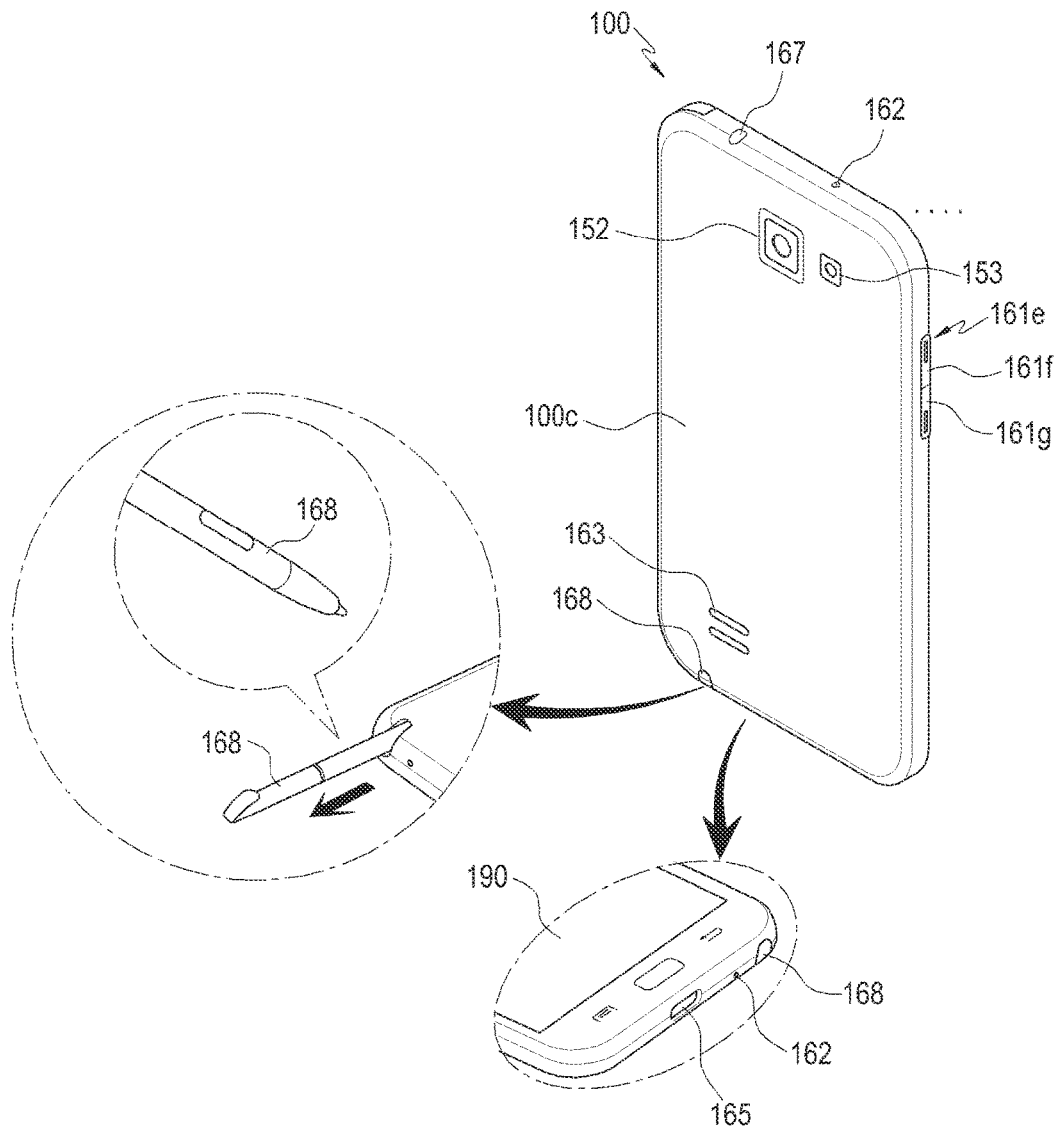
FIG. 3 is a rear perspective view of a user device according to various embodiments of the present disclosure.

The user device 100 may be connected to an external device (not shown) through at least one of the mobile communication module 120, the sub-communication module 130, a connector 165, and an earphone connector jack 167 (illustrated in FIG. 3). The term 'external device' may include a variety of devices that may be detachably connected to the user device 100 by wire, such as an earphone, an external speaker, a Universal Serial Bus (USB) memory, a charger, a cradle, a docking station, a Digital Multimedia Broadcasting (DMB) antenna, a mobile payment device, a health care device (e.g., a blood sugar meter, and/or the like), a game console, a vehicle navigator, and the like. The 'external device' may include a device wirelessly connectable to the user device 100 by short-range communication, such as a Bluetooth communication device, a Near Field Communication (NFC) device, a Wireless Fidelity (Wi-Fi) Direct communication device, a wireless Access Point (AP), and the like. In addition, the user device 100 may be connected wirelessly or wiredly to another user device such as a portable phone, a smart phone, a tablet PC, a desktop PC, a digitizer, an input device, a camera, a server, and/or the like.

The sub-communication module 130 may include at least one of a Wireless Local Area Network (WLAN) module 131, a short-range communication module 132, and the like.

The multimedia module 140 may include at least one of a broadcasting communication module 141, an audio play module 142, a video play module 143, and the like.

The camera module 150 may include at least one of a first camera 151 and a second camera 152. According to various embodiments of the present disclosure, the camera module 150 may include at least one of a barrel 155 that zooms in or zooms out the first camera 151 and/or the second camera 152, a motor 154 that controls movement of the barrel 155 for zoom-in or zoom-out of the barrel 155, a flash 153 that provides a light source for photo capture, and the like according to a main usage of the user device 100.

The I/O module 160 includes at least one of buttons 161, a microphone 162, a speaker 163, a vibration motor 164, the connector 165, and a keypad 166. The I/O module 160 may also include an earphone connector jack 167, an input unit 168, an insertion/removal sensing switch 169, and the like.

The controller 110 may include a Central Processing Unit (CPU) 111, a Read Only Memory (ROM) 112 that stores a control program to control the user device 100, and a Random Access Memory (RAM) 113 that stores signals or data received from the outside of the user device 100 or for use as a memory space for an operation performed by the user device 100. According to various embodiments of the present disclosure, the CPU 111 may include a various number of cores (e.g., the CPU 111 may include one or more cores). The CPU 111, the ROM 112, and the RAM 113 may be connected to one another through an internal bus.

The controller 110 may control the mobile communication module 120, the sub-communication module 130, the multimedia module 140, the camera module 150, the GPS module 157, the I/O module 160, the sensor module 170, the memory 175, the power supply 180, the touch screen 190, and the touch screen controller 195.

When an input unit 168 hovers above one of a plurality of objects displayed on the touch screen 190, the controller 110 may detect the hovering of the input unit 168 and identify the object corresponding to the position of the hovering. In addition, the controller 110 may determine the height of the input unit 168 above the user device 100 and detect a hovering input event according to the determined height. The hovering input event may include at least one of pressing of a button in the input unit 168, tapping of the input unit 168, faster movement of the input unit 168 than a predetermined speed, and a touch of the input unit 168 on an object. A different haptic pattern may be set according to the distance between the input unit 168 and the touch screen 190. Distances based on which different haptic patterns are set may be changed. Upon generation of a hovering input event, the controller 110 may display a predetermined hovering input effect corresponding to the hovering input event on the touch screen 190.

The controller 110 may detect the input unit 168 by scanning the touch screen 190, measure at least one parameter at the position of the input unit 168, and switch the touch screen 190 to a mode corresponding to the measured parameter. The controller 110 may compare the measured parameter with a predetermined threshold and switch the mode of the touch screen 190 to a passive mode or a digital mode based on the comparison result. If a voltage at the position of the input unit 168 is lower than a predetermined voltage threshold or the distance between the input unit 168 and the touch screen 190 is larger than a predetermined distance threshold, the controller 110 may control the touch screen 190 to operate in the passive mode. If the voltage at the position of the input unit 168 is equal to or higher than the predetermined voltage threshold or the distance between the input unit 168 and the touch screen 190 is equal to or smaller than the predetermined distance threshold, the controller 110 may control the touch screen 190 to operate in the digital mode. The passive mode may be a mode in which although the input unit 168 is detected, the detected input unit 168 does not lead to at least one of mode switching and mode control of the touch screen 190. The digital mode may be a mode in which the user device 100 may communicate with the detected input unit 168 and/or supply power to the detected input unit 168.

If the touch screen 190 operates in the digital mode, the controller 110 may analyze a feedback signal received from the input unit 168, determine the presence or absence of a battery in the input unit 168, and switch the touch screen 190 to a passive digital mode or an active digital mode based on the determination result. In the absence of a battery in the input unit 168, the touch screen 190 may operate in the passive digital mode, whereas in the presence of a battery in the input unit 168, the touch screen 190 may operate in the active digital mode. The controller 110 may determine the type of the input unit 168 based on a measured parameter.

The mobile communication module 120 may connect the user device 100 to an external device through one or more antennas (not shown) by mobile communication under the control of the controller 110. The mobile communication module 120 may transmit a wireless signal to or receive a wireless signal from a portable phone (not shown), a smart phone (not shown), a tablet PC (not shown), or another device (not shown) that has a phone number input to the user device 100, for a voice call, a video call, an SMS, an MMS, and/or the like.

The sub-communication module 130 may include at least one of the WLAN module 131 and the short-range communication module 132. For example, the sub-communication module 130 may include only the WLAN module 131, only the short-range communication module 132, or both the WLAN module 131 and the short-range communication module 132. The sub-communication module 130 may transmit a control signal to or receive a feedback signal from the input unit 168. A signal transmitted or received between the user device 100 and the input unit 168 may include at least one of a field for supplying power to the input unit 168, a field for detecting touch or hovering of the input unit 168 on or above the touch screen 190, a field for detecting pressing or input of a button of the input unit 168, an Identifier (ID) of the input unit 168, and a field indicating the X and Y coordinates of the input unit 168. The input unit 168 may transmit a feedback signal to the user device 100 in response to a control signal received from the user device 100.

The WLAN module 131 may be connected to the Internet under the control of the controller 110 in a place in which a wireless AP (not shown) is installed. The WLAN module 131 supports the WLAN standard, Institute of Electrical and Electronics Engineers (IEEE) 802.11x. The short-range communication module 132 may conduct short-range wireless communication between the user device 100 and another device such as, for example, an image forming device (not shown) under the control of the controller 110. The short-range communication may conform to Bluetooth, Infrared Data Association (IrDA), Wi-Fi Direct, Near Field Communication (NFC), and/or the like.

The controller 110 may communicate with a nearby or remote communication device or the input unit 168 through at least one of the WLAN module 131, and the short-range communication module 132 in the sub-communication module 130. The communication with the nearby or remote communication device or the input unit 168 may be conducted by transmitting and receiving control signals.

The user device 100 may include at least one of the mobile communication module 120, the WLAN module 131, and the short-range communication module 132 according to the capabilities of the user device 100. For example, the user device 100 may include a combination of the mobile communication module 120, the WLAN module 131, and the short-range communication module 132 according to the capabilities of the user device 100. One or more of the mobile communication module 120, the WLAN module 131, and the short-range communication module 132 form a transceiver, which does not limit the scope of the present disclosure.

The multimedia module 140 may include the broadcasting communication module 141, the audio play module 142, and/or the video play module 143. The broadcasting communication module 141 may receive a broadcast signal (e.g., a TV broadcast signal, a radio broadcast signal, a data broadcast signal, and/or the like) and additional broadcasting information (e.g., an Electronic Program Guide (EPG), Electronic Service Guide (ESG), and/or the like) from a broadcasting station through a broadcasting communication antenna (not shown) under the control of the controller 110. The audio play module 142 may open a stored or received digital audio file (e.g., a file having such an extension as mp3, wma, ogg, way, and/or the like) under the control of the controller 110. The video play module 143 may open a stored or received digital video file (e.g., a file having an extension such as mpeg, mpg, mp4, avi, mov, mkv, and/or the like) under the control of the controller 110. The video play module 143 may also open a digital audio file.

The multimedia module 140 may include the audio play module 142 and the video play module 143 without the broadcasting communication module 141. Alternatively, the audio play module 142 or the video play module 143 of the multimedia module 140 may be incorporated into the controller 110.

The camera module 150 may include at least one of the first camera 151 and the second camera 152 to capture a still image or a video under the control of the controller 110. The camera module 150 may include at least one of the barrel 155 to zoom in or zoom out to capture an object, the motor 154 to control movement of the barrel 155, the flash 153 to provide an auxiliary light source required for capturing an image, and/or the like. The first camera 151 may be disposed on the front surface of the user device 100, and the second camera 152 may be disposed on the rear surface of the user device 100. Alternatively, the first camera 151 and the second camera 152 may be arranged near to each other (e.g., the distance between the first camera 151 and the second camera 152 may be between 1 cm and 8 cm) in order to capture a three-dimensional still image or video.

Each of the first camera 151 and the second camera 152 may include a lens system and an image sensor. Each of the first camera 151 and second camera 152 may convert an optical signal incident on (or captured by) the lens system to an electrical image signal and provide the electrical image signal to the controller 110. A user may capture a video or a still image through the first camera 151 and second camera 152.

The GPS module 157 may receive signals from a plurality of GPS satellites (not shown) in Earth orbit and calculate a position of the mobile device 100 based on the Time of Arrivals (ToAs) of satellite signals from the GPS satellites to the user device 100.

The I/O module 160 may include, but not limited to, at least one of the plurality of buttons 161, the microphone 162, the speaker 163, the vibration motor 164, the connector 165, the keypad 166, the earphone connector jack 167, and the input unit 168. The I/O module 160 may provide a cursor control such as a mouse, a trackball, a joy stick, cursor directional keys, and/or the like for communication with the controller 110 or control of cursor movement on the touch screen 190. The I/O module 160 may include an insertion/removal sensing switch 169.

The buttons 161 may be formed on the front surface, a side surface, or the rear surface of a housing of the user device 100, and may include at least one of a power/lock button (not shown), a volume button (not shown), a menu button, a home button, a back button, and a search button.

The microphone 162 receives a voice or a sound and converts the received voice or sound to an electrical signal under the control of the controller 110.

The speaker 163 may output sounds corresponding to various signals (e.g., a wireless signal, a broadcast signal, a digital audio file, a digital video file, a photo shot, and/or the like) received from the mobile communication module 120, the sub-communication module 130, the multimedia module 140, and the camera module 150 to the outside of the user device 100. The speaker 163 may also output a sound corresponding to a control signal transmitted to the input unit 168 through the short-range communication module 132. The sound corresponding to the control signal may include a sound related to activation of a vibration device 520 of the input unit 168, a sound with a volume changed according to a vibration strength, and a sound related to deactivation of the vibration device 520. The speaker 163 may output sounds corresponding to functions (e.g., a button manipulation sound, a ringback tone for a call, and/or the like) performed by the user device 100. One or more speakers 163 may be disposed at an appropriate position or positions of the housing of the user device 100.

The vibration motor 164 may convert an electrical signal to a mechanical vibration under the control of the controller 110. For example, when the user device 100 receives an incoming voice call from another device (not shown) in a vibration mode, the vibration motor 164 may operate. One or more vibration motors 164 may be mounted inside the housing of the user device 100. The vibration motor 164 may operate in response to a user's touch on the touch screen 190 and a continuous movement of the touch on the touch screen 190.

The connector 165 may be used as an interface connecting the user device 100 to an external device (not shown) and/or a power source (not shown). The connector 165 may transmit data stored in the memory 175 to the external device via a cable connected to the connector 165 or may receive data from the external device via the cable, under the control of the controller 110. The user device 100 may receive power or charge a battery (not shown) from the power source via the cable connected to the connector 165.

The keypad 166 may receive a key input from the user to control the user device 100. The keypad 166 includes a physical keypad (not shown) formed in the user device 100 or a virtual keypad (not shown) displayed on the touch screen 190. The physical keypad may not be provided according to the capabilities or configuration of the user device 100.

An earphone (not shown) may be inserted into the earphone connector jack 167 and thus connected to the user device 100. The input unit 168 may be inserted and kept in the user device 100. When the input unit 168 is used, the input unit 168 may be extended or removed from the user device 100. An insertion/removal sensing switch 169 is provided in an internal area of the user device 100 into which the input unit 168 is inserted, in order to operate in response to insertion and removal of the input unit 168. The insertion/removal sensing switch 169 may output signals corresponding to insertion and removal of the input unit 168 to the controller 110. The insertion/removal sensing switch 169 may be configured so as to directly or indirectly contact the input unit 168, when the input unit 168 is inserted. Therefore, the insertion/removal sensing switch 169 may output, to the controller 110, a signal corresponding to insertion or removal of the input unit 168 depending on whether the insertion/removal sensing switch 169 contacts the input unit 168 directly or indirectly.

The sensor module 170 may include at least one sensor (not shown) to detect a state of the user device 100. For example, the sensor module 170 may include a proximity sensor that detects whether the user is close to the user device 100, an illuminance sensor that detects the amount of ambient light around the user device 100, a motion sensor that detects a motion of the user device 100 (e.g., rotation, acceleration, vibration of the user device 100, and/or the like), a geomagnetic sensor that detects a point of the compass using the earth's magnetic field, a gravity sensor that detects the direction of gravity, an altimeter that detects an altitude by measuring the air pressure, and/or the like. At least one sensor may detect a state of the user device 100, generate a signal corresponding to the detected state, and transmit the generated signal to the controller 110. A sensor may be added to or removed from the sensor module 170 according to the capabilities of the user device 100.

The memory 175 may store input/output signals or data in accordance with operations of the mobile communication module 120, the sub-communication module 130, the multimedia module 140, the camera module 150, the GPS module 157, the I/O module 160, the sensor module 170, and the touch screen 190 under the control of the controller 110. The memory 175 may store a control program to control the user device 100 or the controller 110, and applications.

The term "memory" corresponds to the memory 175, the ROM 112 and the RAM 113 within the controller 110, or a memory card (not shown) (e.g., a Secure Digital (SD) card, a memory stick, and/or the like) mounted to the user device 100. The memory may include a non-volatile memory, a volatile memory, a Hard Disk Drive (HDD), a Solid State Drive (SSD), and/or the like.

The memory 175 may store applications having various functions such as a navigation application, a video call application, a game application, and a time-based alarm application, and/or the like, images used to provide GUIs related to the applications, user information, text, databases or data related to a method of processing a touch input, background images (e.g., a menu screen, a waiting screen, and the like) or operation programs required to operate the user device 100, and images captured by the camera module 150. The memory 175 is a non-transitory machine-readable medium (e.g., a non-transitory computer-readable medium). A non-transitory machine-readable medium may be defined as a medium that provides data to a machine so that the machine may perform a specific function. The memory 175 may include a volatile medium and a non-volatile medium. All these media should be a type that transfers commands detectable by a physical device that reads the commands to the machine.

The non-transitory machine-readable medium includes, but not limited to, at least one of a floppy disk, a flexible disk, a hard disk, a magnetic tape, a Compact Disk Read Only Memory (CD-ROM), an optical disk, a punch card, a paper tape, a RAM, a Programmable ROM (PROM), an Erasable PROM (EPROM), and a Flash-EPROM.

The power supply 180 may supply power to one or more batteries (not shown) mounted in the housing of the user device 100 under the control of the controller 110. The one or more batteries may supply power to the user device 100. Further, the power supply 180 may supply power received from an external power source (not shown) via the cable connected to the connector 165 to the user device 100. The power supply 180 may also supply power received wirelessly from the external power source to the user device 100 by a wireless charging technology.

The user device 100 may include the at least one touch screen 190 that provides GUIs corresponding to various services (e.g., call, data transmission, broadcasting, photo capture, and/or the like). A pen recognition device 191 and a touch recognition device 192 may be referred to as a pen recognition panel and a touch panel, respectively. Each touch screen 190 may output an analog signal corresponding to at least one user input to a GUI to a touch screen controller 195 corresponding to the touch screen 190. The user device 100 may include a plurality of touch screens 190. A touch screen controller 195 may be provided in correspondence with each touch screen 190, in order to receive an analog signal corresponding to a touch on the touch screen 190. The touch screens 190 may be connected to a plurality of housings by means of a hinge or to a single housing without using a hinge. As described before, various embodiments of the present disclosure will be described in the context of the user device 100 having a single touch screen 190.

The touch screen 190 may receive at least one user input through a user's body (e.g., a finger) or the input unit 168 (e.g., a stylus pen, an electronic pen, and/or the like). The touch screen 190 may include the pen recognition device 191 for recognizing an input of a pen such as a stylus pen or an electronic pen and the touch recognition device 192 for recognizing a touch. The pen recognition device 191 may determine the distance between the pen and the touch screen 190 based on a magnetic field, an ultrasonic wave, optical information, a surface acoustic wave, and/or the like, whereas the touch recognition device 192 may detect a touched position based on touch-incurred charge migration. The touch recognition device 192 may detect any touch that causes static electricity and recognize a touch of the input unit 168 such as a finger, a pen, and/or the like. The touch screen 190 may receive a continuous movement of one touch among one or more touches. The touch screen 190 may transmit an analog signal corresponding to a continuous movement of a touch to the touch screen controller 195.

According to various embodiments of the present disclosure, the touch may include a non-contact touch (e.g., a detectable gap between the touch screen 190 and the user's body part or the input unit 168 is about 5 mm), not limited to contacts between the touch screen 190 and the user's body part or the input unit 168. The gap detectable to the touch screen 190 may vary according to the capabilities or configuration of the user device 100. According to various embodiments of the present disclosure, to distinguish a touch event generated by contact between the touch screen 190 and a user's body or the input unit 168 from a non-contact input event (e.g., a hovering event), the touch screen 190 may output different detection values (e.g., different analog voltage or current values) for the touch event and the hovering event. Further, the touch screen 190 may output a different detection value (e.g., a different current value) according to the distance between an area of a hovering event and the touch screen 190.

According to various embodiments of the present disclosure, the pen recognition device 191 or the touch recognition device 192 may be implemented as a resistive type, a capacitive type, an infrared type, an acoustic wave type, and/or the like.

To receive an input of the user's body and an input of the input unit 168 simultaneously or sequentially, the touch screen 190 may include at least two touch screen panels that detect touches or proximity of the user's body and the input unit 168, respectively. The at least two touch screen panels may provide different output values to the touch screen controller 195 and the touch screen controller 195 may determine whether an input from the touch screen 190 is an input of the user's body or an input of the input unit 168 by distinguishing values received from the at least two touch screen panels. The touch screen 190 displays at least one object.

Specifically, the touch screen 190 may be configured by stacking a panel to detect an input of a finger or the input unit 168 by a change in induced power and a panel to detect contact of a finger or the input unit 168 on the touch screen 190, in close contact with each other or partially apart from each other. This touch screen 190 includes a large number of pixels to display an image. The touch screen 190 may include at least one of an LCD panel, an Organic Light Emitting Diode (OLED) panel, a Light Emitting Diode (LED) panel, and the like.

The touch screen 190 may include a plurality of sensors that detect the position of a finger or the input unit 168 touching the touch screen 190 or spaced from the touch screen 190 by a predetermined distance. Each of the sensors may have a coil structure. In a sensor layer formed by the plurality of sensors, each sensor may have a predetermined pattern and a plurality of electrode lines may be formed. Thus, when a finger or the input unit 168 touches the touch screen 190 or hovers above the touch screen 190, a sensing signal having a changed waveform is generated due to the capacitance between the sensor layer and the input means. The touch screen 190 may transmit the sensing signal to the controller 110. The distance between the input unit 168 and the pen recognition device 191 may be determined based on the strength of a magnetic field formed by a coil 510 of the input unit 168.

According to various embodiments of the present disclosure, the touch screen controller 195 converts an analog signal received from the touch screen 190 to a digital signal (e.g., X and Y coordinates) and transmits the digital signal to the controller 110. The controller 110 may control the touch screen 190 using the received digital signal. For example, the controller 110 may select or execute a shortcut icon (not shown) or an object displayed on the touch screen 190 in response to a touch event or a hovering event. The touch screen controller 195 may be incorporated into the controller 110.

According to various embodiments of the present disclosure, the touch screen controller 195 may determine the distance between the area of a hovering event and the touch screen 190 by detecting an output value (e.g., a current value) of the touch screen 190, convert information about the distance to a digital signal (e.g., a Z coordinate), and transmit the digital signal to the controller 110.

Figure 2:
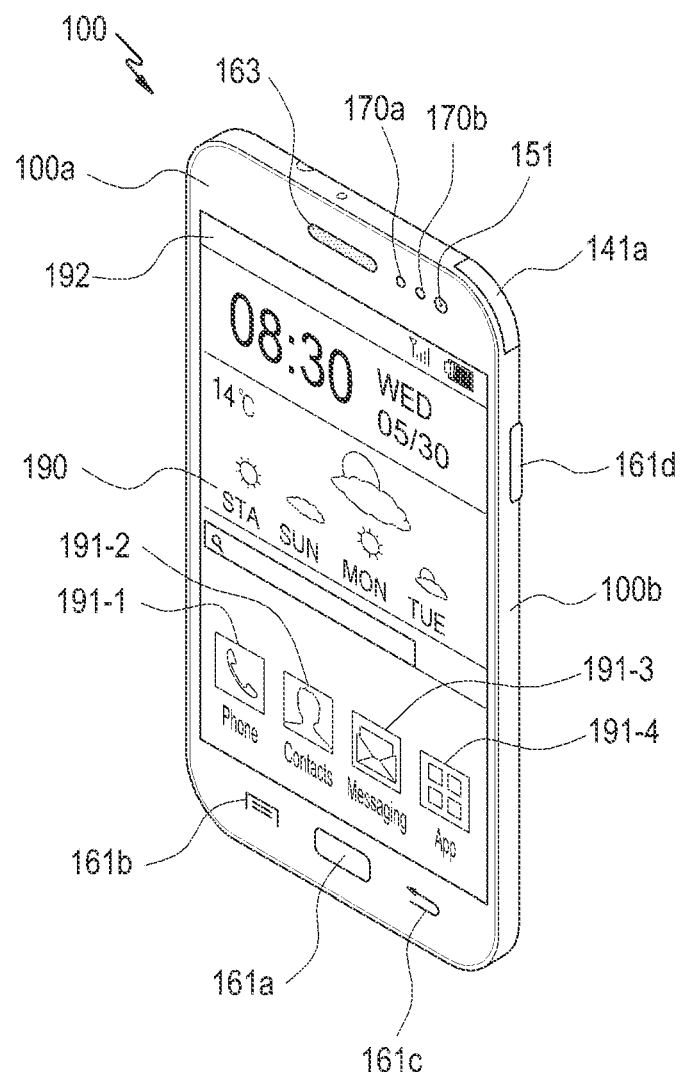
FIG. 2 is a front perspective view of a user device according to various embodiments of the present disclosure.

FIG. 2 is a front perspective view of a user device according to an embodiment of the present disclosure, and FIG. 3 is a rear perspective view of a user device according to an embodiment of the present disclosure.

Referring to FIG. 2, the touch screen 190 may be disposed at the center of the front surface 100a of the user device 100, occupying almost the entirety of the front surface 100a. As illustrated in FIG. 2, a main home screen is displayed on the touch screen 190, by way of example. For example, the main home screen may be the first screen to be displayed on the touch screen 190, when the user device 100 is powered on or activated. If the user device 100 has different home screens of a plurality of pages, the main home screen may be the first of the home screens of the plurality of pages. Shortcut icons 191-1 (e.g., to execute a phone application), 191-2 (e.g., to execute a contacts application) and 191-3 (e.g., to execute a messaging application) used to execute frequently used applications, an application switch key 191-4, time, weather, and the like may be displayed on the home screen. The application switch key 191-4 is used to display a menu screen on the touch screen 190. A status bar 192 may be displayed at the top of the touch screen 190 in order to indicate states of the user device 100 such as a battery charged state, a received signal strength, a current time, and/or the like.

A home button 161a, a menu button 161b, and a back button 161c may be formed at the bottom of the touch screen 190.

The home button 161a is used to display the main home screen on the touch screen 190. For example, upon touching of the home button 161a while any home screen other than the main home screen or a menu screen is displayed on the touch screen 190, the main home screen may be displayed on the touch screen 190. Upon touching of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus available on the touch screen 190. The link menus may include a widget adding menu, a background changing menu, a search menu, an edit menu, an environment setting menu, and/or the like.

The back button 161c may display the screen previous to a current screen or end the latest used application.

The first camera 151, an illuminance sensor 170a, and a proximity sensor 170b may be arranged at a corner of the front surface 100a of the user device 100. The speaker 163 may be arranged on the front surface 100a of the user device 100. The second camera 152, the flash 153, and the speaker 163 may be arranged on the rear surface 100c of the user device 100.

For example, a power/reset button 161d, a volume button 161e (e.g., including a volume increase button 161f and a volume decrease button 161g), a terrestrial DMB antenna 141a that receives a broadcast signal, and one or more microphones 162 may be disposed on side surfaces 100b of the user device 100. The DMB antenna 141a may be mounted to the user device 100 fixedly or detachably.

The connector 165 is formed on the bottom side surface of the user device 100. The connector 165 may include a plurality of electrodes and may be connected to an external device by wire. The earphone connector jack 167 may be formed on the top side surface of the user device 100, in order to allow an earphone to be inserted.

The input unit 168 may be inserted into the bottom side surface of the user device 100. The input unit 168 may be inserted and kept inside the user device 100. When the input unit 168 is used, the input unit 168 may be extended and removed from the user device 100.

Figure 4:
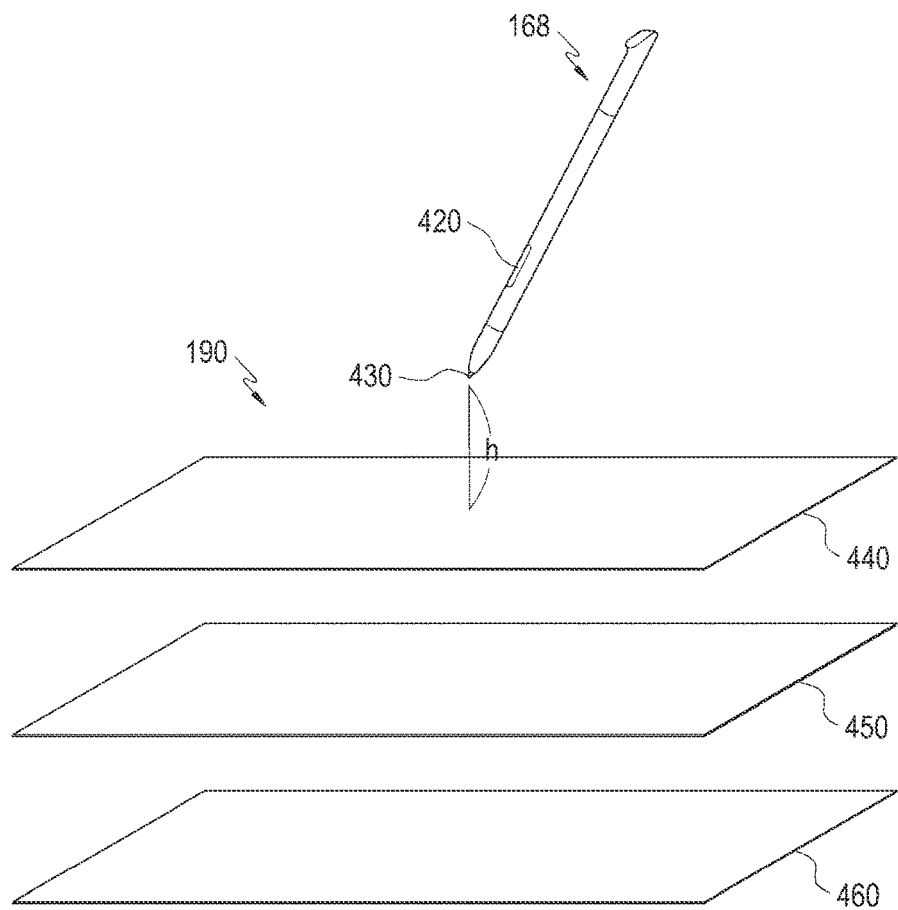
FIG. 4 is a sectional view of an input unit and a digitizer according to various embodiments of the present disclosure.

FIG. 4 is a sectional view of an input unit and a digitizer according to various embodiments of the present disclosure. For example, FIG. 4 illustrates an input unit and internal sections of a digitizer according to various embodiments of the present disclosure.

Referring to FIG. 4, the touch screen 190 may include a touch panel 440, a display panel 450, and a pen recognition panel 460. The display panel 450 may be an LCD panel, an Active Matrix Organic Light Emitting Diode (AMOLED) panel, or the like, which displays various images according to operation states of the user device 100, application execution, services, and/or the like, and displays a plurality of objects.

The touch panel 440 is a capacitive type. The capacitive touch panel is formed by coating thin layers of a metal conductive material (e.g., Indium Tin Oxide (ITO) layers) onto both surfaces of glass to flow current on the surfaces of the glass and coating a dielectric material to store charge. When an input means (e.g., a user's finger, a pen, and/or the like) touches a surface of the touch panel 440, a specific amount of charge migrates to a touched position due to static electricity. The touch panel 440 detects the touched position by recognizing a current variation caused by the charge migration. The touch panel 440 may detect every touch that may cause static electricity and may also detect a touch of a finger or a pen as an input means.

The pen recognition panel 460 is an EMR type. For example, the EMR touch panel may include an electro-inductive coil sensor (not shown) having a grid structure in which a plurality of loop coils are arranged in a predetermined first direction and a second direction perpendicular to the first direction, and an electronic signal processor (not shown) that provides an Alternating Current (AC) signal having a predetermined frequency sequentially to each loop coil of the electro-inductive coil sensor. When the input unit 168 having a built-in resonant circuit is located near to a loop coil of the pen recognition panel 460, a magnetic field transmitted from the loop coil generates current based on mutual electromagnetic induction in the resonant circuit of the input unit 168. An inductive magnetic field is generated based on the current in the coil (e.g., 510 in FIG. 5) of the resonant circuit of the input unit 168 and the pen recognition panel 460 detects the inductive magnetic field from a loop coil in a signal reception state, thereby detecting the position and pressure of the input unit 168, pressing of a button in the input unit 168, and the height h of a pen point 430 of the input unit 168 above the pen recognition panel 460. As illustrated in FIG. 4, those skilled in the art will readily understand that the detected height h of the pen point 430 above the pen recognition panel 460 of the touch screen 190 may vary depending on the capabilities or configuration of the user device 100. The input unit 168 may generate current based on electromagnetic induction through the pen recognition panel 460. The pen recognition panel 460 may detect a hovering input or a touch input based on a generated current. For example, the input unit 168 may be an electromagnetic pen or an EMR pen. The input unit 168 may be configured to include a button 420 that may change an electromagnetic induction value caused by a coil inside a pen body near to the pen point 430.

According to various embodiments of the present disclosure, if the input unit 168 includes a battery, a corresponding loop coil does not transfer a magnetic field toward the input unit 168. The distance, position, and pen pressure of the input unit 168 may be detected based on an induced current detected through the input unit 168. The operation mode of at least one of the touch panel 440 and the pen recognition panel 460 may be switched under the control of the controller 110. For example, at least one of the touch panel 440 and the pen recognition panel 460 may switch to a mode corresponding to at least one parameter measured at the position of the input unit 168 under the control of the controller 110. At least one of the touch panel 440 and the pen recognition panel 460 may switch to a passive mode or a digital mode according to a voltage at the position of the input unit 168 or the distance to the input unit 168. In the passive mode, the pen recognition panel 460 transmits a signal for operating the input unit 168 as a passive input unit to the input unit 168 through a coil and receives a passive signal from the input unit 168, whereas in the digital mode, the pen recognition panel 460 transmits a signal for operating the input unit 168 as a digital input unit to the input unit 168 through a coil and receives a digital signal from the digital input unit 168. According to various embodiments of the present disclosure, the digital mode may further be branched into a plurality of modes depending on data communication with the input unit 168 and the type of the input unit 168. To operate these plural modes, the user device 100 may transmit a control signal to and receive a feedback signal from the input unit 168. The digital mode may be branched into an active digital mode in the presence of a battery in the input unit 168 and a passive digital mode in the absence of a battery in the input unit 168. If the detected input unit 168 is a passive input unit, at least one of the touch panel 440 and the pen recognition panel 460 may operate in the passive mode.

The touch screen controller 195 may include a touch panel controller and a pen recognition panel controller. The touch panel controller may convert an analog signal corresponding to a hand touch or a pen touch, received from the touch panel 440 to a digital signal (e.g., X, Y and Z coordinates) and may transmit the digital signal to the controller 110. The pen recognition panel controller may convert an analog signal corresponding to a hovering or touch of the input unit 168, received from the pen recognition panel 460 to a digital signal and may transmit the digital signal to the controller 110. Such a device that converts an analog signal corresponding to a hand touch or a pen touch and/or an analog signal corresponding to a hovering or pressure of the input unit 168 to a digital signal so that a visual image may be input, stored, output, or manipulated is referred to as a digitizer. According to various embodiments of the present disclosure, a digitizer includes a touch screen or a screen that recognizes a touch and/or hovering and displays the recognition result. The digitizer may also detect or recognize a user's vital information from the user's iris or eyeball and display the detecting or recognition result. The controller 110 may control the display panel 450, the touch panel 440, and the pen recognition panel 460 based on the digital signals received from the touch panel controller and the pen recognition panel controller. For example, the controller 110 may display a predetermined screen on the display panel 450 in response to a hovering or touch of a finger, a pen, the input unit 168, and/or the like.

According to various embodiments of the present disclosure, the touch panel 440 may detect a finger touch or a pen touch and the pen recognition panel 460 may detect a hovering or pressure of the input unit 168 in the user device 100. Thus, the controller 110 of the user device 100 may distinguish a finger touch or a pen touch from a hovering or touch of the input unit 168. Although only one touch screen 190 is shown in FIG. 4, various embodiments of the present disclosure are not limited to a single touch screen. Rather, according to various embodiments of the present disclosure, the user device 100 may have a plurality of touch screens. Each touch screen may be engaged with one housing by a hinge or a plurality of touch screens may be mounted in a single housing in the user device 100. As illustrated in FIG. 4, each touch screen may include a display panel and at least one touch panel.

Figure 5:
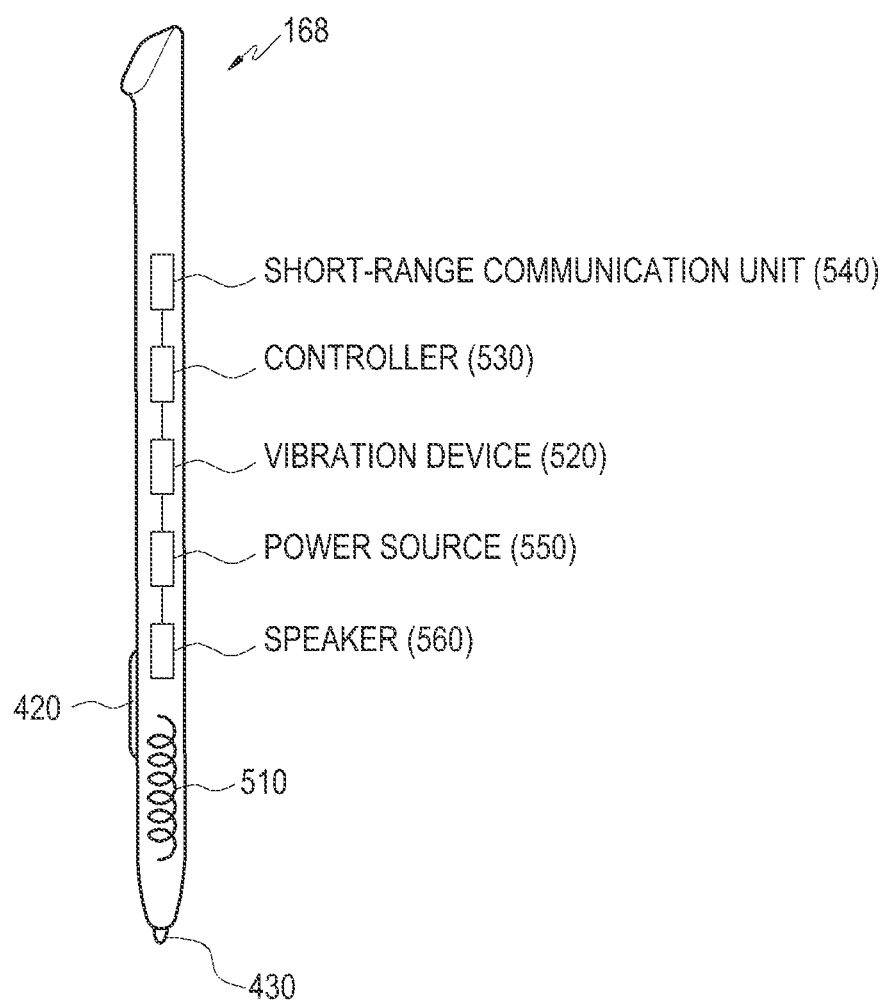
FIG. 5 illustrates an input unit according to various embodiments of the present disclosure.

FIG. 5 illustrates an input unit according to various embodiments of the present disclosure. For example, FIG. 5 is a block diagram of an input unit according to various embodiments of the present disclosure.

Referring to FIG. 5, the input unit 168 (e.g., an EMR pen) may include a pen body, the pen point 430, the pen button 520, the coil 510, the vibration device 520, a controller 530, a short-range communication unit 540, and a power source 550.

The pen point 430 may be formed at the tip of the pen body.

The coil 510 may be disposed near to the pen point 430 within the pen body.

The vibration device 520 provides a haptic effect.

The controller 530 analyzes a control signal received from the user device 100, controls the vibration strength and period of the vibration device 520 to provide a haptic effect to the input unit 168, controls short-range communication, and detects a pen pressure.

The short-range communication unit 540 conducts short-range communication with the user device 100.

The power source 550 supplies power to the input unit 168.

According to various embodiments of the present disclosure, the input unit 168 may also include a Resistor-Capacitor (RC) circuit to communicate with the user device 100. The RC circuit may be included inside the input unit 168 or incorporated in the controller 530.

The input unit 168 may further include a speaker 560 that outputs a sound corresponding to a vibration period and/or a vibration strength of the input unit 168. The speaker 560 may output a sound corresponding to a haptic effect provided to the input unit 168 simultaneously with the speaker 163 of the user device 100 or a predetermined time (e.g., 10 ms) before or after the speaker 163 of the user device 100 emits a sound.

The input unit 168 having the above-described structure may operate by EMR. Upon generation of a magnetic field around a coil at a specific position of the pen recognition device 191 by the coil 510, the pen recognition device 191 may determine the position of the input unit 168 by detecting the position of the magnetic field.

More specifically, the speaker 560 may output sounds corresponding to various signals (e.g., a wireless signal, a broadcast signal, a digital audio file, a digital video file, and/or the like) received from the mobile communication module 120, the sub-communication module 130, or the multimedia module 140 of the user device 100 under the control of the controller 530. Further, the speaker 560 may output a sound corresponding to a function executed in the user device 100 (e.g., a button manipulation sound or a ringback tone in a call). One or more speakers 560 may be provided at an appropriate position(s) of a housing of the input unit 168.

The controller 530 may analyze at least one control signal received from the user device 100 through the short-range communication unit 540 and control the vibration period and vibration strength of the vibration device 520 in the input unit 168 according to the analyzed control signal. The controller 530 may also transmit a feedback signal in response to a received control signal or input unit state information (e.g., the remaining battery time, communication state, identification information, and/or the like of the input unit 168) to the user device 100. A control signal is transmitted and received between the user device 100 and the input unit 168. A control signal may be transmitted and received periodically between the user device 100 and the input unit 168 for a predetermined time or until a hovering ends. The power source 550, which supplies operation power to the controller 530, may be charged with current induced from the user device 100.

The user device 100 may transmit a control signal to the input unit 168 through at least one of the mobile communication module 120 and the sub-communication module 130. The control signal may include at least one of information for activating the vibration device 520 of the input unit 168, information indicating a vibration strength for the input unit 168, information for deactivating the vibration device 520 of the input unit 168, and information indicating a total duration of a haptic effect. The control signal may be about 8 bits and repeatedly transmitted at every predetermined interval (e.g., 5 ms) to control vibrations of the input unit 168. Therefore, the user may recognize repetition of vibrations at predetermined intervals, for a haptic effect. For example, a control signal that controls vibrations may include information listed in Table 1.

TABLE 1

| Field | Activation of vibration device | Vibration strength | Deactivation of vibration device |
|---|---|---|---|
| Information | 1 | 125 125 131 131 0 | 2 |

As illustrated in Table 1, the control signal includes information required to activate the vibration device 520 of the input unit 168, information indicating a vibration strength for the vibration device 520, and information required to deactivate the vibration device 520 of the input unit 168.

Figure 6:
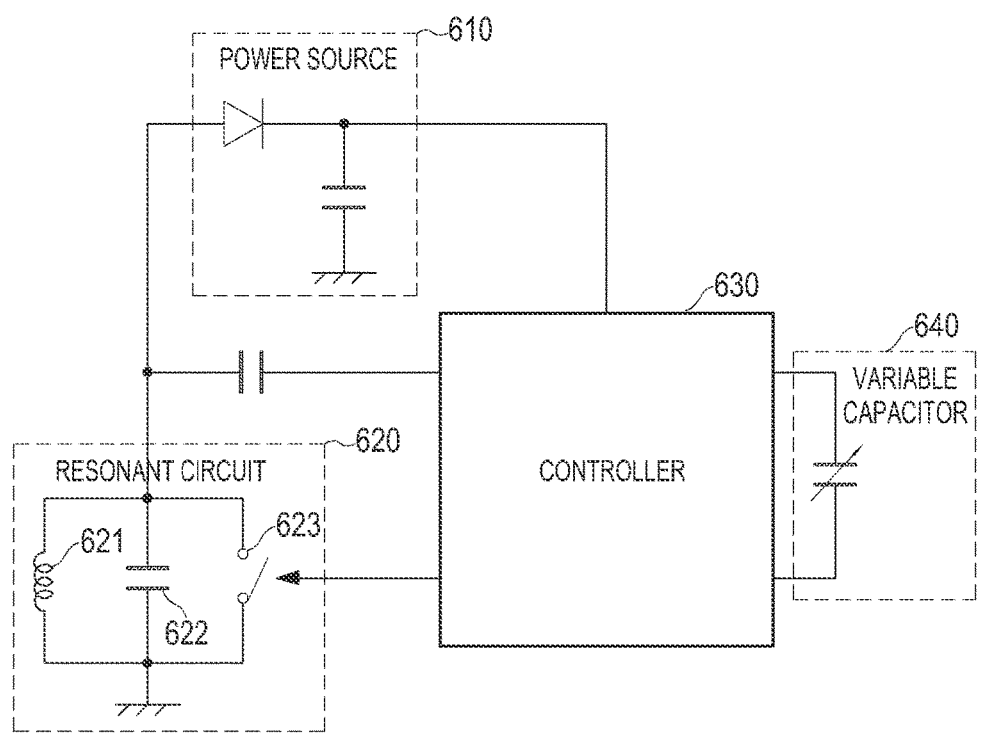
FIG. 6 is a block diagram of an input unit for transmitting a signal to and receiving a signal from a user device according to various embodiments of the present disclosure.

FIG. 6 is a block diagram of an input unit for transmitting a signal to and receiving a signal from a user device according to various embodiments of the present disclosure.

Referring to FIG. 6, according to various embodiments of the present disclosure, an input unit may include a power source 610 with a driving capacitor, a resonant circuit 620 that generates a resonant frequency, a variable capacitor 640 that changes a capacitance thereof according to a pen pressure of the input unit against the user device 100, and a controller 630 that measures a pen pressure using a value of the variable capacitor 640 and controls the resonant circuit 620. The power source 610 supplies power to the driving capacitor during an activation interval. If the driving capacitor is charged with power, the power source 610 checks (e.g., determines) the presence or absence of a pen pressure. The variable capacitor 640 may include a pen pressure capacitor.

The resonant circuit 620 and the variable capacitor 640 may be included in the controller 630 or may be separately configured in the input unit. The variable capacitor 640 may be configured to include at least one of a capacitor and a coil. The resonant circuit 620 may be connected to the controller 630 through a switch 623 and may include a coil 621 and a capacitor 622. The resonant circuit 620 may be controlled by the controller 630 according to On/Off of the switch 623. The controller 630 may communicate digitally with the pen recognition panel (or the touch screen) by controlling the resonant circuit 620 through the switch 623 and thus outputting a signal (e.g., a value 1) through the resonant circuit 620 or outputting no signal by grounding (e.g., a value 0). The controller 630 may measure a pen pressure based on a change in the capacitance of the variable capacitor 640.

Figure 7:
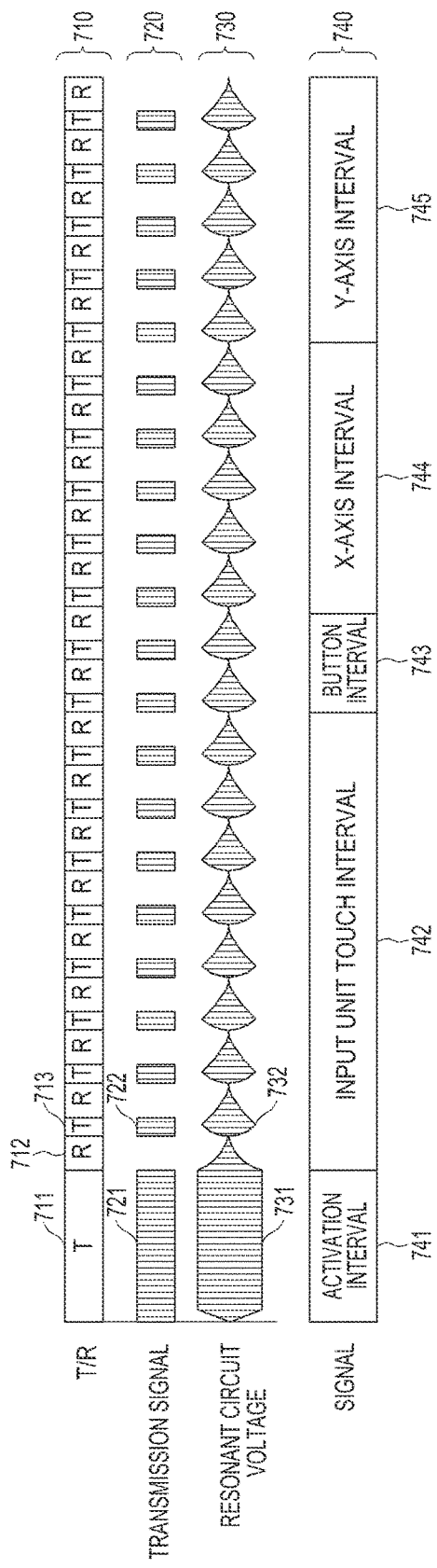
FIG. 7 illustrates transmission and reception between a user device and an input unit according to various embodiments of the present disclosure.

FIG. 7 illustrates transmission and reception between a user device and an input unit according to various embodiments of the present disclosure.

Referring to FIG. 7, the user device 100 transmits at least one signal 720 to the input unit 168 in predetermined time slots 710. Among the predetermined time slots 710, the pen recognition panel may receive signals from the input unit 168 in R time slots 712 and the user device 100 may transfer energy in an EM field to the input unit 168 in T time slots 711 and 713. To activate an IC of the input unit 168, the user device 100 may transmit signals during the predetermined interval 711 and may periodically alternate between transmission and reception in the time slots 713 and 712. Reference numeral 720 denotes the period, duration, or voltage of a transmitted signal. Signals 721 and 722 are transmitted respectively in the time slots 711 and 713. Reference numeral 730 denotes changes in a resonant circuit voltage of the input unit 168. Reference numeral 731 denotes a resonant circuit voltage when the signal 721 is transmitted and reference numeral 732 denotes a resonant circuit voltage when the signal 722 is transmitted. The resonant circuit voltages 731 and 732 may decrease in magnitude over time. The input unit 168 may be charged with energy from the user device 100 in the time slots 713 and may transmit a signal to the user device 100 through the resonant circuit in the time slots 712. A signal strength may vary according to the distance to the input unit 168 and a voltage. The controller 630 of the input unit 168 may switch on or off the switch 623 as illustrated in FIG. 6 and a signal may or may not be transmitted to the user device 100 depending on On/Off of the switch 623. Accordingly, digital information 0 or 1 may be transmitted to the user device 100. Reference numeral 740 denotes the characteristics of signals transmitted between the user device 100 and the input unit 168. For example, a signal to activate the IC of the input unit is transmitted during an activation interval 741. At least one signal may be transmitted to the input unit 168 and the power source 610 may accumulate energy to be transmitted to the controller 530 of the input unit 168 during the activation interval 741. The controller 530 of FIG. 5 (e.g., the controller 630 in FIG. 6) may acquire a pen pressure value using the variable capacitor 640 of FIG. 6. For example, when the input unit 168 touches the touch screen 190 or the pen point 430 is pressed against the touch screen 190, an associated signal is transmitted and received during an input unit touch interval 742. At least one function signal to be applied to the button 420 of the input unit 168 is transmitted and received during a button interval 743. The X coordinate of the input unit 168 is transmitted and received during an X-axis interval 744 and the Y coordinate of the input unit 168 is transmitted and received during a Y-axis interval 745.

Upon receipt of a signal 720 from the user device 100, the input unit 168 drives the IC using the received signal 720 and charges the power source 550 including a battery or a capacitor. The input unit 168 generates a resonant signal using the received energy. In this manner, the user device 100 may continuously transmit a signal that activates the IC of the input unit 168 for a predetermined time period and may transmit a signal periodically at every predetermined interval after the predetermined time period. The input unit 168 is charged using a signal received from the user device 100 and transmits a feedback signal in response to the signal to the user device 100. The feedback signal may include information about the pressure of the pen point 430 of the input unit 168 and the coordinates of the input unit 168. The feedback signal may further include information about the button 420 of the input unit 168 and identification information that identifies the input unit 168.

Figure 8:
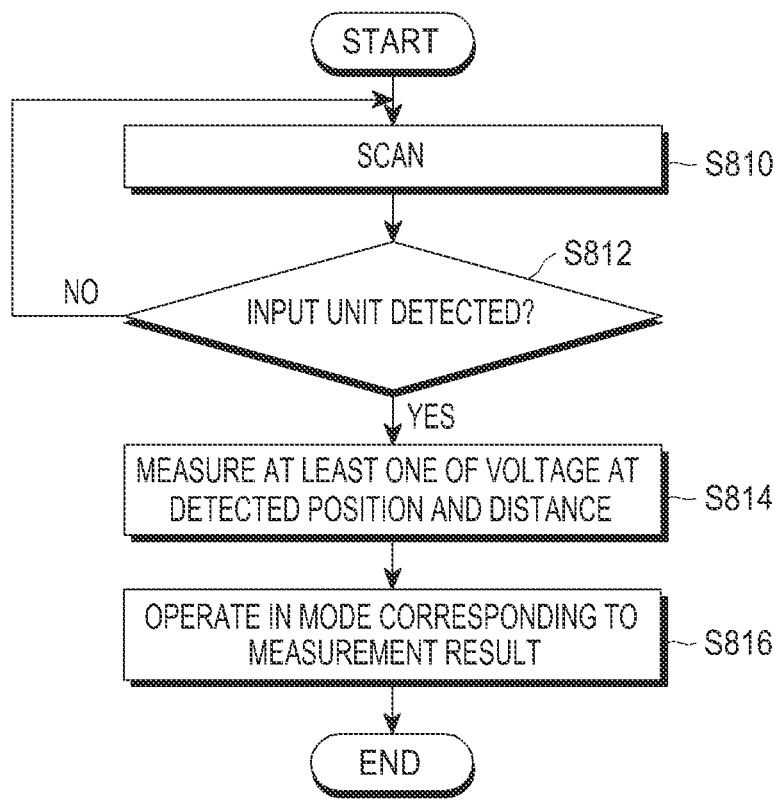
FIG. 8 illustrates a method for controlling an operation mode of a digitizer by a user device according to various embodiments of the present disclosure.
Figure 9A:
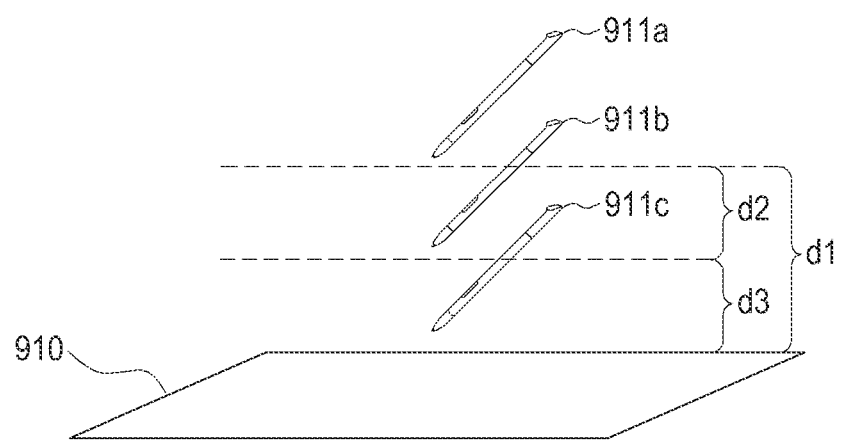
FIG. 9A illustrates distance ranges between a digitizer and an input unit in an operation for changing a mode of the digitizer according to various embodiments of the present disclosure.

FIG. 8 illustrates a method for controlling an operation mode of a digitizer by a user device according to various embodiments of the present disclosure. FIG. 9A illustrates distance ranges between a digitizer and an input unit in an operation for changing a mode of the digitizer according to various embodiments of the present disclosure, and FIG. 9B illustrates more specified distance ranges between a digitizer and an input unit in an operation for changing a mode of the digitizer according to various embodiments of the present disclosure.

Figure 9B:
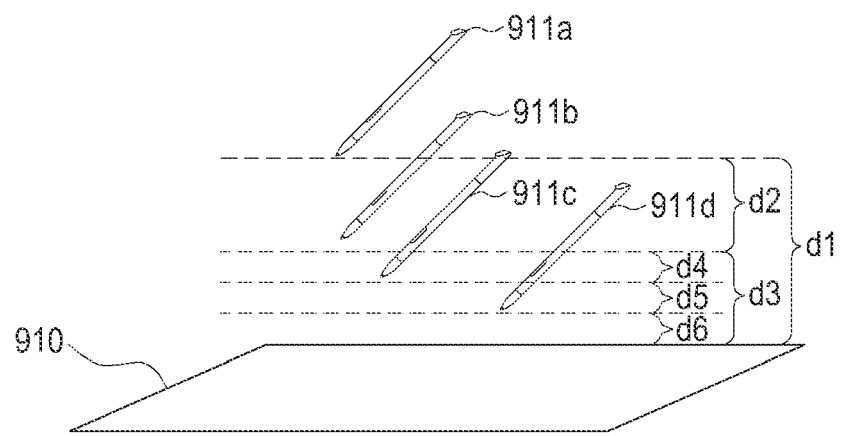
FIG. 9B illustrates more specified distance ranges between a digitizer and an input unit in an operation for changing a mode of the digitizer according to various embodiments of the present disclosure.

With reference to FIGS. 8, 9A, and 9B, a method for controlling an operation mode of a digitizer by a user device according to various embodiments of the present disclosure will be described below.

Referring to FIG. 8, at operation S810, the user device fully scans the pen recognition panel to determine the presence or absence of the input unit. The full scan is performed to determine whether the input unit is placed on or above the pen recognition panel. The full scan may be performed periodically or when the input unit is not detected. Referring to FIGS. 9A and 9B, if the distance between an input unit 911a and a pen recognition panel 910 is equal to or larger than a first distance range d1, the pen recognition panel 910 may be fully scanned. At the moment, a voltage detected by the input unit 911a is close to 0. In this case, the user device 100 may transmit a signal for detecting the input unit 911a less frequently or may increase the strength of the transmitted signal.

At operation S812, the user device determines whether an input unit is detected.

If the user device determines that an input unit is not detected at operation S812, then the use device may return to operation S810 at which the user device may fully scan the pen recognition panel a predetermined time later or at a longer full scan cycle.

In contrast, if the user device determines that an input unit is detected at operation S812, then upon detection of the input unit, the user device proceeds to operation S814 at which at least one of a voltage that the input unit detects at a coil corresponding to the position of the detected input unit and the distance between the input unit and the pen recognition panel is measured.

Upon detection of the input unit, the user device measures at least one of a voltage that the input unit detects at a coil corresponding to the position of the detected input unit and the distance between the input unit and the pen recognition panel.

Referring to FIG. 9A, the input unit 911a is apart from the pen recognition panel 910 by the first distance range d1 or larger, an input unit 911b is apart from the pen recognition panel within a second distance range d2, and an input unit 911c is apart from the pen recognition panel within a third distance d3. Larger voltages may be detected in the order of the input units 911a, 911b, and 911c and in the order of the first distance range d1, the second distance range d2, and the third distance range d3.

If the input unit 911b is within the second distance range d2 or the voltage is between 0 and a predetermined voltage threshold, the controller of the user device may operate the user device and the input unit in a passive mode. The passive mode is a mode in which the input unit does not need a digital-mode function because the pen recognition panel and the input unit are distant from each other.

If the input unit 911c exists within the third distance range d3 or the voltage is larger than the predetermined voltage threshold, the controller of the user device may operate the user device and the input unit in a digital mode. If the controller determines that the voltage received from the input unit is larger than the predetermined voltage threshold and thus the input unit is close to the pen recognition panel, the controller switches the pen recognition panel to the digital mode so that a signal to activate an IC of the input unit is transmitted to the input unit and thus the IC of the input unit is operated during the activation interval 741 of FIG. 7.

Referring to FIG. 9B, five distance ranges are defined between the pen recognition panel 910 and input units 911a, 911b, 911c, and 911d. More specifically, the third distance range d3 of FIG. 9A is further divided into three distance ranges, for example, fourth, fifth, and sixth distance ranges d4, d5, and d6. According to various embodiments of the present disclosure, fewer or more distance ranges than five may be defined and thus operation modes of the touch screen may be defined accordingly. The input unit 911a is apart from the pen recognition panel 910 by the first distance range d1 or larger, the input unit 911b is apart from the pen recognition panel 910 within the second distance range d2, the input unit 911c is apart from the pen recognition panel 910 within a fourth distance range d4, and the input unit 911*d* is apart from the pen recognition panel 910 within a fifth distance range d5. The sum of the fourth, fifth, and sixth distance ranges may be equal to the third distance range d3 illustrated in FIG. 9A. Larger voltages may be detected in the order of the input units 911*a*, 911*b*, 911*c*, and 911*d* and in the order of the first, second, fourth, fifth, and six distance ranges d1, d2, d3, d4, d5, and d6.

If the input unit 911*b* is within the second distance range d2 or the voltage detected by the input unit 911*b* is between 0 and a predetermined voltage threshold, the controller of the user device switches the pen recognition panel to the passive mode. The passive mode refers to a mode in which although the input unit is detected, the input unit does not need a digital-mode function due to a large distance between the input unit and the pen recognition panel. For example, when the input unit 911*b* exists within the second distance range d2, the pen recognition panel may transmit a signal for locating the input unit 911*b* without transmitting a signal for activating the IC of the input unit 911*b*.

If the input unit 911*c* is located within the fourth, fifth, or sixth distance range d4, d5, or d6, the controller of the user device may switch the pen recognition panel to the digital mode in correspondence with the position of the input unit 911*c*. The digital mode may be branched into a plurality of modes.

For example, the digital mode may be categorized into a first mode in which hovering coordinates and button input information of the input unit 911*c* except for pen pressure information about the input unit 911*c* are detected, a second mode in which the same operation as in the first mode is performed except for a shorter activation interval 741, and a third mode in which the function of the first mode is supported and pen pressure information about the input unit 911*c* is additionally detected. The characteristics 740 of signals transmitted and received between the pen recognition panel and the input unit may be changed according to the digital modes. In the first mode, the user device 100 transmits a signal that supplies power to the IC of the input unit 911*c* and data communication is possible between the user device 100 and the input unit 911*c*. A signal to activate the IC of the input unit 911*c* may be transmitted in the first mode. Because a touch or a pen pressure change of the input unit 911*c* does not need to be measured in the first mode, a signal for detecting a touch or a pen pressure change of the input unit 911*c* may not be transmitted to the input unit 911*c*. The same function as the first mode may be performed in the second mode. In addition, a signal for supplying operation power to the IC of the input unit 911*d*, a signal indicating the X and Y coordinates of the input unit 911*d*, and a signal carrying button information are transmitted and received between the user device 100 and the input unit 911*d*. The signal carrying the button information (e.g., a signal that detects a button input) is about at least one function applicable to the digital-mode input unit 911*d*. For example, if an air view function is executed using a hovering function of the input unit 911*d* in the digital mode, a specific function may be executed in a current air view in the hovering state by input of a button. Because no contact occurs between the pen recognition panel 910 and the input unit 911*d* in the fifth distance range d5, transmitting a signal carrying pen pressure information is not necessary. A signal carrying touch information or pen pressure information is transmitted and received between the pen recognition panel 910 and the input unit 911*d* in the third mode. Because the input unit 911*d* may touch the pen recognition panel 910 at any time, signals transmitted and received between the input unit 911*d* and the pen recognition panel 910 may carry pen pressure information. When the input unit touches the pen recognition panel within the sixth distance range d6, a signal carrying pen pressure information may be transmitted. Because the input unit may receive energy with the highest efficiency in the sixth distance range d6 among the other distance ranges, the transmission period of a signal that activates the IC of the input unit may be shorter in the sixth distance range d6 than in the fourth and fifth distances ranges d4 and d5. As described before, a plurality of distance ranges may be defined between the pen recognition panel and the input unit and different functions may be provided according to the distance ranges in various embodiments of the present disclosure. The plurality of distance ranges and functions applied in the distance ranges may be set by a developer, a manufacturer, or a user environment setting.

According to various embodiments of the present disclosure, at least one parameter may be measured at a point at which the input unit is positioned. The at least one parameter may include at least one of a feedback signal from the input unit, the strength of the feedback signal, reception or non-reception of the feedback signal, the phase of the feedback signal, a variation in the strength of the feedback signal over time, reception or non-reception of the feedback signal over time, a variation in the phase of the feedback signal over time, a digital communication value included in the feedback signal, state information about the input unit, the type of an object displayed on the user device, an input type required for an object displayed on the user device, and/or the like.

The measurement is compared with a predetermined threshold. The threshold may be different according to a measurement method or a measured parameter. The threshold may be adjusted variably. For example, the threshold may be configured according to user settings or preferences.

At operation S816, the pen recognition panel is switched to a mode corresponding to the measurement. The user device may switch the pen recognition panel to the passive mode or the digital mode according to the comparison result between the measurement and the predetermined threshold. The passive mode is set for the pen recognition panel, if a voltage at the position of the input unit is smaller than a predetermined voltage threshold or the distance between the input unit and the pen recognition panel is larger than a predetermined distance threshold. If the voltage at the position of the input unit is equal to or larger than the predetermined voltage threshold or the distance between the input unit and the pen recognition panel is equal to or smaller than the predetermined distance threshold, the digital mode is set for the pen recognition panel.

The passive mode is a mode in which although the input unit is detected, the input unit does not need a digital-mode function due to a large distance between the input unit and the pen recognition panel. If a voltage received from the input unit is larger than a predetermined voltage threshold and thus the input unit is determined to be close to the pen recognition panel, the pen recognition panel is switched to the digital mode and a signal that activates the IC of the input unit is transmitted to the input unit during the activation interval 741 of FIG. 7.

The digital mode may further be divided into a plurality of modes. For example, the plurality of modes may include a first mode in which hovering coordinates and button input information except for pen pressure information about the input unit are detected, a second mode identical to the first mode except for a shorter activation interval, and a third mode in which pen pressure information about the input unit is detected in addition to the function of the first mode.

As described before with reference to FIGS. 9A and 9B, the pen recognition panel may be switched to a mode corresponding to a measurement result. However, if the pen recognition panel transmits a control signal for controlling the IC to the input unit in the digital mode but fails to receive a feedback signal from the input unit (e.g., a voltage induced from the input unit is 0), the pen recognition panel may be switched to the passive mode or a full scan mode. If the input unit is a passive input unit without an IC, the pen recognition panel may be switched to the passive mode.

Now a description will be given of a method for controlling an operation mode of a pen recognition panel, when an input unit having a resonant circuit is detected.

Figure 10:
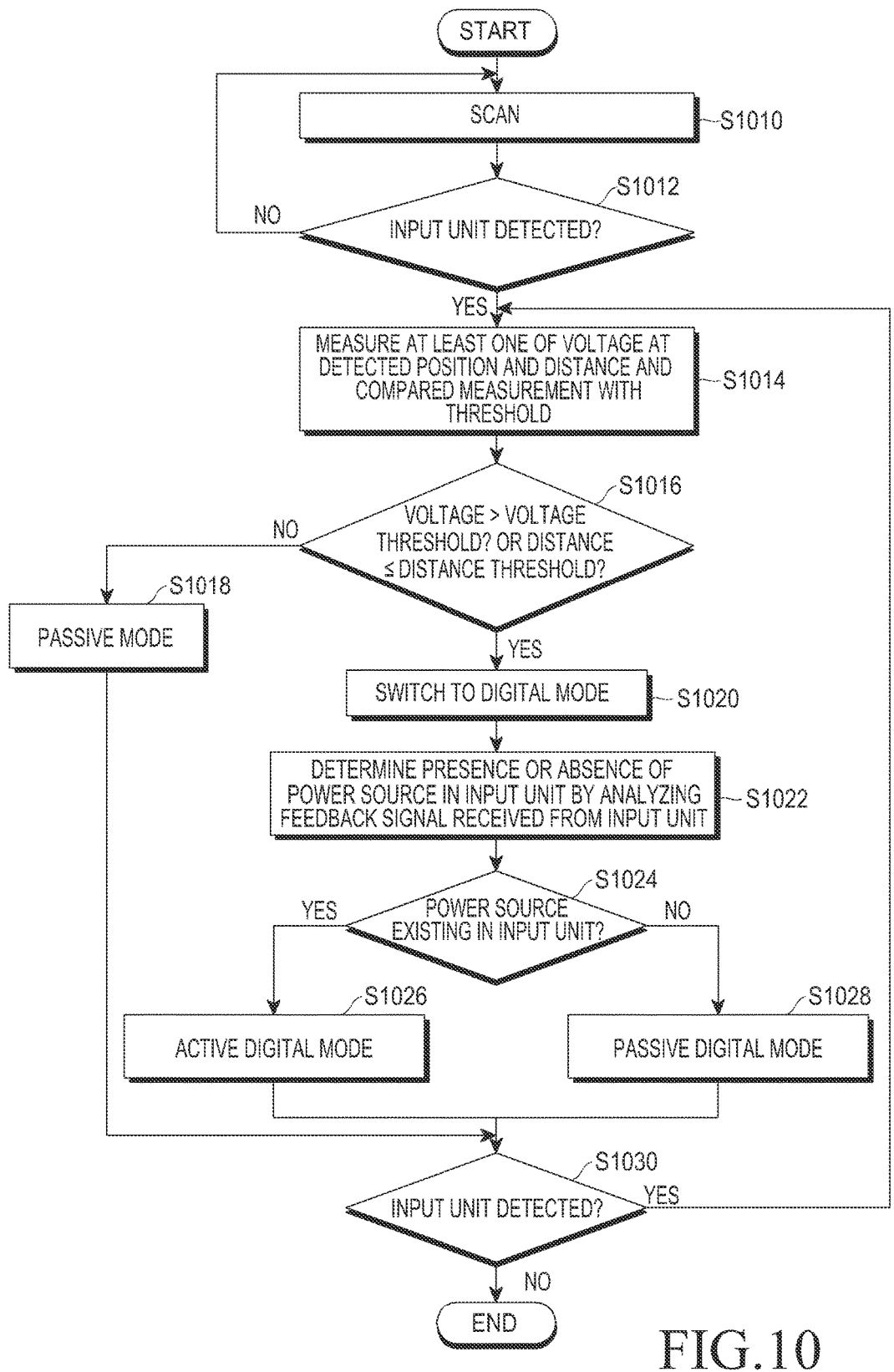
FIG. 10 illustrates a method for controlling an operation mode of a digitizer in correspondence with an input unit by a user device according to various embodiments of the present disclosure.

FIG. 10 illustrates a method for controlling an operation mode of a digitizer in response to an input unit by a user device according to various embodiments of the present disclosure.

According to various embodiments of the present disclosure, an input unit includes a resonant circuit. The input unit may have a power source or a battery chargeable with a signal or an electric field received from a user device. Because a controller of this digital input unit transmits pen pressure information digitally, the digital input unit may outperform a passive input unit that transmits a pen pressure based on a phase difference between resonant frequencies because the digital input unit may be less affected by an environment (e.g., an ambient magnetic field). Digital input units may be classified into an active digital input unit that has a battery and thus transmits a signal to the pen recognition panel by driving a controller without receiving energy from the user device, and a passive digital input unit that receives energy from the user device without a battery and drives an IC with the received energy. Despite the need for a battery, the active digital input unit advantageously increases energy efficiency because the user device does not need to transmit energy to the input unit. In contrast, the passive digital input unit should receive energy from the user device, thereby decreasing energy efficiency. However, the passive digital input unit may operate without using a battery.

With reference to FIG. 10, a method for controlling an operation mode of a digitizer according to an input unit by a user device in various embodiments of the present disclosure will be described in detail.

Referring to FIG. 10, at operation S1010, the user device fully scans the pen recognition panel to check (e.g., determine) the presence or absence of the input unit. The pen recognition panel may be fully scanned in the manner described before with reference to FIG. 8. According to various embodiments of the present disclosure, the pen recognition panel may be scanned across the entire area or over a partial area.

At operation S1012, the user device determines whether an input unit is detected.

If the user device determines that an input unit is not detected at operation S1012, then the use device may return to operation S1010 at which the user device may fully scan the pen recognition panel a predetermined time later or at a longer full scan cycle. Or the pen recognition panel may be scanned on a predetermined area unit basis.

In contrast, if the user device determines that an input unit is detected at operation S1012, then upon detection of the input unit, the user device proceeds to operation S1014 at which at least one of a voltage at the detected position of the input unit and the distance to the input unit is measured and compared with a predetermined threshold.

Upon detection of the input unit, at least one of a voltage at the detected position of the input unit and the distance to the input unit is measured. According to various embodiments of the present disclosure, in addition to the voltage and distance of the input unit, at least one of a plurality of parameters may be measured or determined, such as a feedback signal from the user device, the strength of the feedback signal, the phase of the feedback signal, a variation in the strength of the feedback signal over time, reception or non-reception of the feedback signal over time, a variation in the phase of the feedback signal over time, a digital communication value included in the feedback signal, information about a short-range communication scheme of the input unit, such as WiFi, Bluetooth, or ZigBee, state information about the input unit, and/or the like.

The type of the input unit may be determined based on the measured parameter. The measurement result may be compared with a predetermined threshold and mode switching of the pen recognition panel may be controlled based on the comparison result. The threshold may be variable depending on the property of a parameter whose measurement is compared with the threshold.

The pen recognition panel operates in the passive mode according to the comparison result at operations S1016 and S1018.

At operation S1016, the user device compares a measured parameter to a predetermined threshold. For example, at operation S1016, the user device determines whether a measured voltage is greater than a threshold voltage. As another example, the user device determines whether a measured distance is less than or equal to a threshold distance.

If the user device determines that the voltage is not greater than the threshold voltage at operation S1016, then the user device may proceed to operation S1018 at which the pen recognition panel operates in the passive mode. Similarly, if the user device determines that the distance is not less than or equal to a threshold distance at operation S1016, then the user device may proceed to operation S1018 at which the pen recognition panel operates in the passive mode.

In contrast, if the user device determines that the voltage is greater than the threshold voltage at operation S1016, then the user device may proceed to operation S1020 at which the pen recognition panel operates in the digital mode (e.g., the pen recognition panel is switched to the digital mode). Similarly, if the user device determines that the distance is less than or equal to a threshold distance at operation S1016, then the user device may proceed to operation S1020 at which the pen recognition panel operates in the digital mode (e.g., the pen recognition panel is switched to the digital mode). Thereafter, the user device may proceed to operation S1022.

According to various embodiments of the present disclosure, many parameters may be measured in addition to a voltage at the position of the input unit and the distance to the input unit. Different thresholds may be used for the various parameters in addition to the voltage and the distance and thus different results may be achieved. For example, if the voltage of the input unit is equal to or smaller than a predetermined voltage threshold or the distance to the input unit is larger than a predetermined distance threshold at operation S1016, the user device operates the pen recognition panel in the passive mode at operation S1018. For example, if the input unit 911b exists within the second distance range d2 of FIG. 9A or the voltage is between 0 and a predetermined voltage threshold, the controller 110 switches the pen recognition panel 910 to the passive mode. The passive mode refers to a mode in which although the input unit is detected, the input unit does not need a digital-mode function due to a large distance between the input unit and the pen recognition panel.

According to various embodiments of the present disclosure, if the phase of the signal falls into a predetermined range, the controller 110 may determine that the input unit does not support the digital mode and thus may operate the pen recognition panel in the passive mode.

According to various embodiments of the present disclosure, the reliability of the feedback signal may be determined using at least one of a variation in the strength of the feedback signal over time, reception or non-reception of the feedback signal over time, and a variation in the phase of the feedback signal over time. If the user device determines that the reliability of the feedback signal is low, the pen recognition panel may be switched to a full scan mode.

According to various embodiments of the present disclosure, identification information about the input unit is received using a digital communication value included in the feedback signal and the pen recognition panel may be operated in a mode corresponding to the identification information about the input unit.

The pen recognition panel is switched to the digital mode according to the comparison result at operations S1016 and S1020. For example, if the voltage of the input unit is larger than the predetermined voltage threshold or the distance to the input unit is equal to or smaller than the predetermined distance threshold at operation S1016, then the user device operates the pen recognition panel in the digital mode at operation S1020. For example, if the input unit 911c is within the third distance range d3 in FIG. 9A or the voltage is larger than the predetermined voltage threshold, the controller 110 switches the pen recognition panel 910 to the digital mode. If the voltage of a signal received from the input unit is larger than the predetermined voltage threshold and thus the controller 110 determines that the input unit is close to the pen recognition panel, the controller 110 switches the pen recognition panel to the digital mode, thereby operating the IC of the input unit.

At operation S1022, the controller may determine the presence or absence of the input unit or the state of the input unit by analyzing a feedback signal received from the input unit. The feedback signal corresponds to a control signal transmitted to the input unit by the user device. The input unit receives the control signal, charges the variable capacitor 640 with the received control signal, and generates a resonant frequency by controlling the resonant circuit 620. For example, the feedback signal may include a signal detected by the generated resonant frequency. In addition, the user device may measure the strength of the feedback signal (e.g., a value larger than a predetermined value), the phase of the feedback signal (e.g., a predetermined frequency range), a variation in the strength of the feedback signal over time (e.g., a predetermined strength pattern: strong weak strong weak weak strong weak weak strong strong), a variation in the phase of the feedback signal over time (e.g., a predetermined phase difference variation pattern), a digital communication value included in the feedback signal (e.g., 01011), information about short-range communication of the input unit such as WiFi, Bluetooth, ZigBee, and/or the like. In this manner, the user device may determine the presence or absence of a power source in the input unit and the power state of the input unit using various values that are fed back from the input unit or measured.

At operation S1024, the user device determines whether a power source exists in an input unit. For example, the user device may determine whether the input unit includes a sufficient power source.

If the user device determines that the input unit includes a sufficient power source at operation S1024, then the user device may proceed to operation S1026 at which the user device 100 operates the pen recognition panel in the active digital mode. As an example, the active digital mode may be set, when the voltage of a signal received from the input unit is larger than a predetermined voltage threshold or the distance between the input unit and the pen recognition panel is equal to or smaller than a predetermined distance threshold. According to various embodiments of the present disclosure, if the voltage of a signal received from the input unit is larger than the predetermined voltage threshold, the user device may determine that the input unit is close to the pen recognition panel and switch or control the mode of the pen recognition panel based on the determination. If the pen recognition panel is switched to the active digital mode, the IC of the input unit may operate through the power source of the input unit. In the active digital mode, the input unit may activate the IC with power of the power source and control the resonant circuit 620 to generate a resonant frequency. The user device may receive a signal from the input unit and analyze the received signal. The user device may determine whether the input unit has a power source or how much power remains in the input unit using the received signal or various parameters.

In contrast, if the user device determines that the input unit does not include a power source at operation S1024, then the user device may proceed to operation S1028 at which the user device operates the pen recognition panel in the passive digital mode. The passive digital mode may be set, when the voltage of a signal received from the input unit is larger than the predetermined voltage threshold or the distance between the input unit and the pen recognition panel is equal to or smaller than the predetermined distance threshold, and a feedback signal for a transmitted signal for activating the IC of the input unit indicates the absence of a power source in the input unit.

At operation S1030, the user device determines whether an input unit is detected.

If the user device determines that an input device is detected at operation S1030, then upon detection of the input unit, the user device (e.g., the controller 110) returns to operation S1014. For example, if the input unit is detected again during or after an active digital-mode operation or a passive digital-mode operation at operation S1030, the controller 110 of the user device may return to operation S014 at which the controller 110 may measure at least one of a voltage at the position of the input unit or the distance to the input unit and compare the measurement with a predetermined threshold.

In contrast, if the user device determines that an input unit is not detected at operation S1030, then the user device may end the method for controlling an operation mode of a digitizer.

Figure 11:
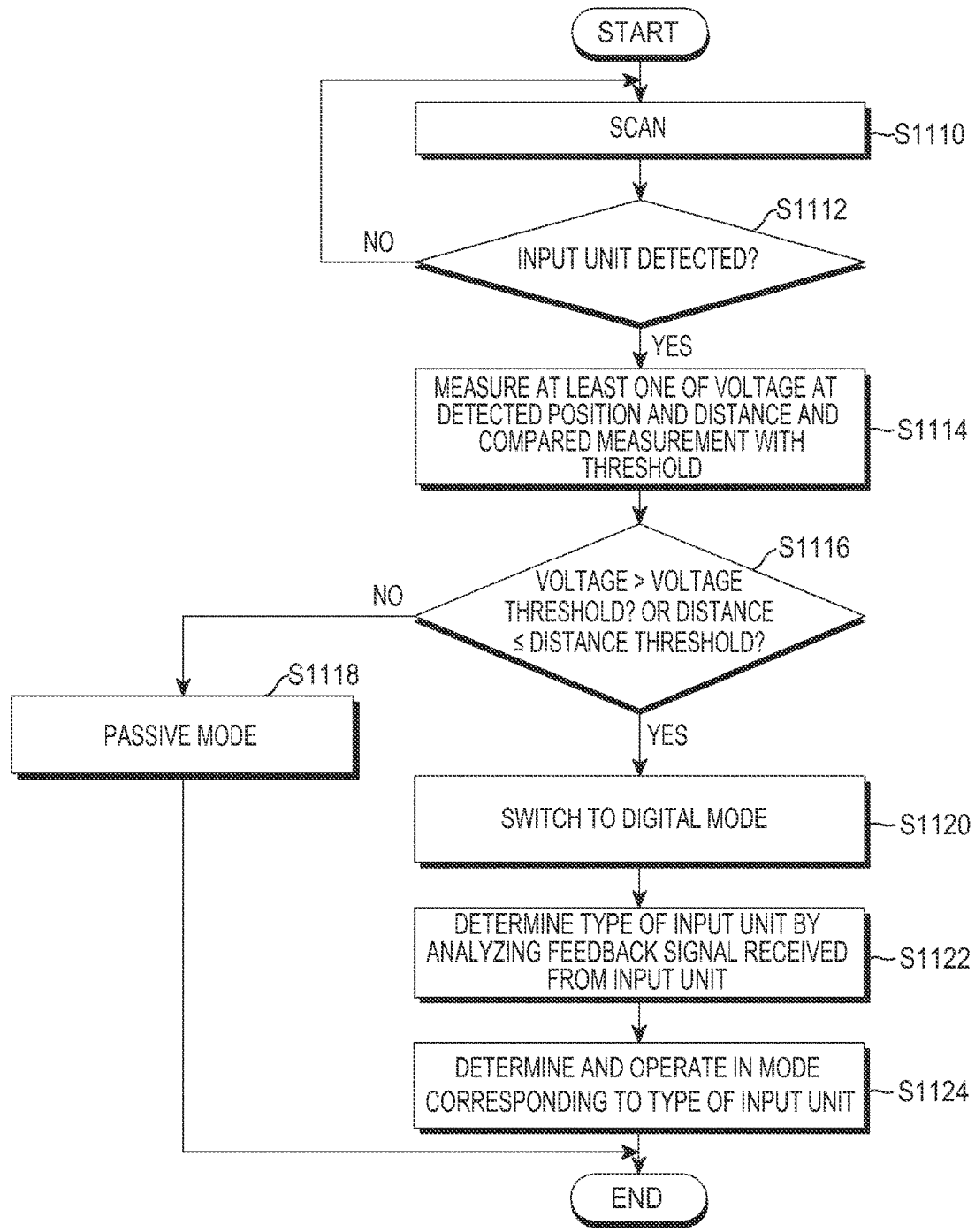
FIG. 11 illustrates a method for controlling an operation mode of a digitizer in correspondence with an input unit by a user device according to various embodiments of the present disclosure.
Figure 12A:
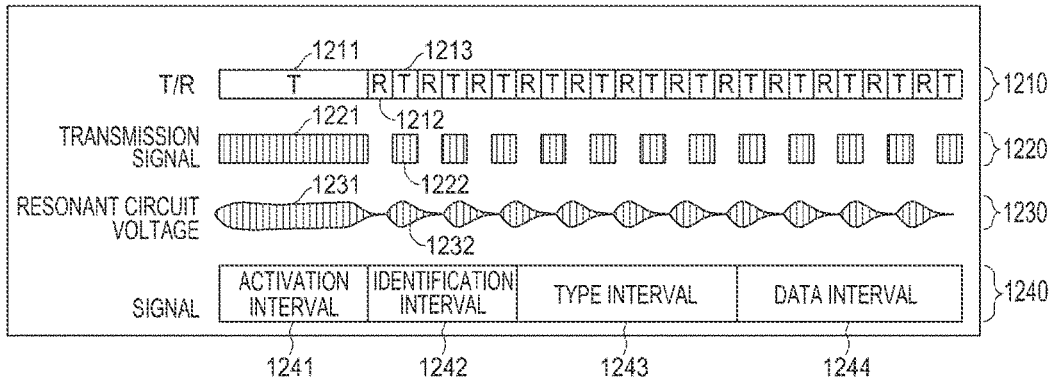
FIG. 12A illustrates transmission and reception to identify a type of an input unit according to various embodiments of the present disclosure.
Figure 12B:
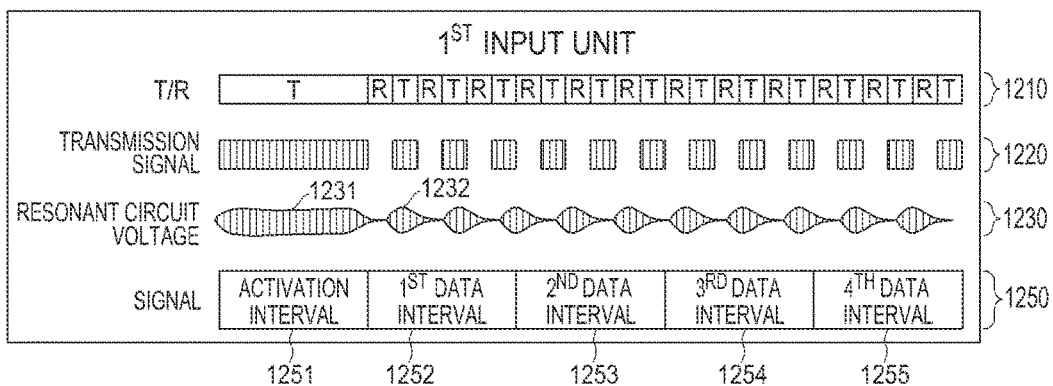
FIG. 12B illustrates transmission and reception between a user device and a first input unit according to various embodiments of the present disclosure.
Figure 12C:
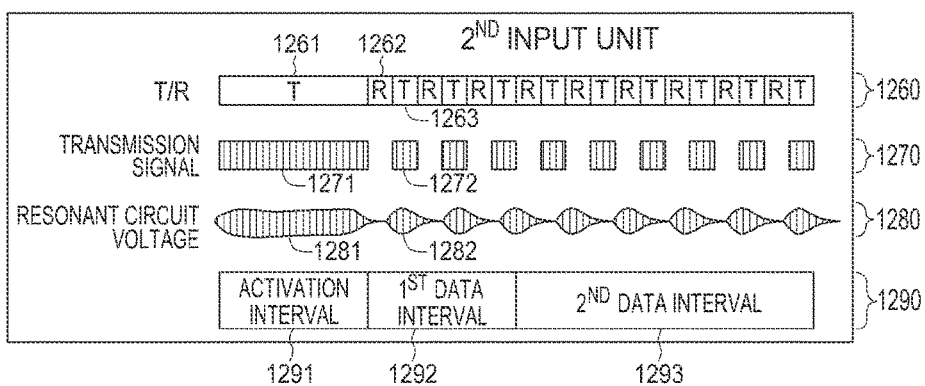
FIG. 12C illustrates transmission and reception between a user device and a second input unit according to various embodiments of the present disclosure.

FIG. 11 illustrates a method for controlling an operation mode of a digitizer according to an input unit by a user device according to various embodiments of the present disclosure. FIG. 12A illustrates transmission and reception to identify a type of an input unit according to various embodiments of the present disclosure, FIG. 12B illustrates transmission and reception between a user device and a first input unit according to various embodiments of the present disclosure, and FIG. 12C illustrates transmission and reception between a user device and a second input unit according to various embodiments of the present disclosure.

According to various embodiments of the present disclosure, an input unit includes, for example, a resonant circuit, an IC, and a memory. Further, the input unit may have a power source or a battery chargeable with a signal or a magnetic field received from a user device. The input unit may include a digital device capable of conducting short-range communication and reading text in addition to the resonant circuit, the IC, and the memory. In comparison to a passive input unit to which power is not supplied, the input unit may have good performance. This type of input unit may include various types of digital devices according to the purpose and product that the input unit serves. For example, the input unit may transmit an Identifier (ID) thereof to the user device.

With reference to FIGS. 11, 12A, 12B, and 12C, a method for controlling an operation mode of a digitizer in correspondence with an input unit by a user device according to various embodiments of the present disclosure will be described below.

Referring to FIG. 11, at operation S110, the user device fully scans the pen recognition panel to check (e.g., determine) the presence or absence of the input unit. The pen recognition panel may be fully scanned in the manner described before with reference to FIG. 8. According to various embodiments of the present disclosure, the pen recognition panel may be scanned across the entire area or over a partial area.

At operation S1112, the user device determines whether an input unit is detected.

If the user device determines that an input unit is not detected at operation S1112, then the use device may return to operation S1110 at which the user device may fully scan the pen recognition panel a predetermined time later or at a longer full scan cycle. Or the pen recognition panel may be scanned on a predetermined area unit basis In contrast, if the user device determines that an input unit is detected at operation S1112, then upon detection of the input unit, the user device proceeds to operation S1014 at which at least one of a voltage at the detected position of the input unit and the distance to the input unit is measured and compared with a predetermined threshold. Upon detection of the input unit, at least one of a voltage at the detected position of the input unit and the distance to the input unit is measured. According to various embodiments of the present disclosure, in addition to the voltage and distance of the input unit, at least one of a plurality of parameters may be measured or determined, such as a feedback signal from the input unit, the strength of the feedback signal, the phase of the feedback signal, a variation in the strength of the feedback signal over time, reception or non-reception of the feedback signal over time, a variation in the phase of the feedback signal over time, a digital communication value included in the feedback signal, information about a short-range communication scheme of the input unit, such as WiFi, Bluetooth, or ZigBee, state information about the input unit, and/or the like.

The type of the input unit may be determined based on the measured parameter. The measurement result may be compared with a predetermined threshold and mode switching of the pen recognition panel may be controlled based on the comparison result. The threshold may be variable depending on the property of a parameter whose measurement is compared with the threshold.

The pen recognition panel operates in the passive mode according to the comparison result at operations S1116 and S1118.

At operation S1116, the user device compares a measured parameter to a predetermined threshold. For example, at operation S1116, the user device determines whether a measured voltage is greater than a threshold voltage. As another example, the user device determines whether a measured distance is less than or equal to a threshold distance.

If the user device determines that the voltage is not greater than the threshold voltage at operation S1116, then the user device may proceed to operation S1118 at which the pen recognition panel operates in the passive mode. Similarly, if the user device determines that the distance is not less than or equal to a threshold distance at operation S1116, then the user device may proceed to operation S1118 at which the pen recognition panel operates in the passive mode.

In contrast, if the user device determines that the voltage is greater than the threshold voltage at operation S1116, then the user device may proceed to operation S1120 at which the pen recognition panel operates in the digital mode (e.g., the pen recognition panel is switched to the digital mode). Similarly, if the user device determines that the distance is less than or equal to a threshold distance at operation S1116, then the user device may proceed to operation S1120 at which the pen recognition panel operates in the digital mode (e.g., the pen recognition panel is switched to the digital mode). Thereafter, the user device may proceed to operation S1122.

According to various embodiments of the present disclosure, many parameters may be measured in addition to a voltage at the position of the input unit and the distance to the input unit. Different thresholds may be used for the various parameters in addition to the voltage and the distance and thus different results may be achieved. For example, if the voltage of the input unit is equal to or smaller than a predetermined voltage threshold or the distance to the input unit is larger than a predetermined distance threshold in operation S1116, the user device operates the pen recognition panel in the passive mode in operation S1118. For example, if the input unit 911b exists within the second distance range d2 of FIG. 9A or the voltage is between 0 and a predetermined voltage threshold, the controller 110 switches the pen recognition panel to the passive mode. The passive mode refers to a mode in which although the input unit is detected, the input unit does not need a digital-mode function due to a large distance between the input unit and the pen recognition panel.

According to various embodiments of the present disclosure, conditions under which a predetermined threshold is applied may be different for many other parameters as well as the voltage and the distance.

The pen recognition panel is switched to the digital mode according to the comparison result at operations S1116 and S1120. If the voltage of the input unit is larger than the predetermined voltage threshold or the distance to the input unit is equal to or smaller than the predetermined distance threshold at operation S1116, the user device operates the pen recognition panel in the digital mode at operation S1120. For example, if the input unit 911c is within the third distance range d3 or the voltage is larger than the predetermined voltage threshold, the controller 110 switches the pen recognition panel to the digital mode. If the voltage of a signal received from the input unit is larger than the predetermined voltage threshold and thus the controller 110 determines that the input unit is close to the pen recognition panel, the controller 110 switches the pen recognition panel to the digital mode, thereby operating the IC of the input unit.

At operation S1122, the controller may determine the type of the input unit by analyzing a signal received from the input unit. For example, the controller 110 may receive identification information about the input unit by a digital communication value included in the signal and may operate the pen recognition panel in a mode corresponding to the identification information about the input unit. If the pen recognition panel is switched to the digital mode, the user device may transmit a signal for activating the input unit to the input unit, receive a feedback signal for the transmitted signal, determine the type of the input unit based on the feedback signal at operation S1122, and proceed to operation S1124 at which the user device determines a mode in which to transmit and receive signals or data to and from the input unit according to the type of the input unit. Information about the mode may be stored in the user device and/or the input unit.

Referring to FIG. 12A, the user device 100 transmits at least one signal 1210 to the input unit 168. The user device 100 transmits a signal 1211 continuously during a predetermined time period to activate the IC of the input unit 168 and transmits a signal a predetermined time later, as indicated by reference numeral 1213. Thereafter, a signal is transmitted periodically to the input unit 168 at every predetermined interval 1212.

Reference numeral 1220 denotes the period, duration, or voltage of the transmitted signal, and signals 1221 and 1222 correspond to the time intervals 1211 and 1213.

Reference numeral 1230 denotes the magnitude of a resonant circuit voltage of the input unit. A signal strength may vary with the distance to the input unit and a voltage. The controller of the input unit may determine whether to transmit a signal during each predetermined time period. The presence and absence of the signal may be interpreted as digital values 1 and 0, respectively.

Reference numeral 1240 denotes the characteristics of signals transmitted and received between the user device and the input unit. For example, at least one signal to activate the IC of the input unit is transmitted during an activation interval 1241. A signal indicating the type of the input unit is transmitted and received during an input unit identification interval 1242, a signal indicating the type of the input unit is transmitted and received during a type interval 1243, and data is transmitted and received between the user device and the input unit during a data interval 1244. The ID and type of the input unit may be determined based on signals transmitted and received between the input unit and the user device.

The user device determines a mode corresponding to the type of the input unit at operation S1122 and operates the pen recognition panel in the determined mode at operation S1124. If the pen recognition mode is switched to the determined mode, the user device may transmit and receive data to and from the input unit.

Referring to FIGS. 12B and 12C, once the type of the input unit is identified in the procedure of FIG. 12A, the user device actually transmits and receives data to and from the input unit.

Referring to FIG. 12B, for example, if the input unit determined at operation S1122 corresponds to a first input unit, reference numeral 1230 denotes the voltage of a resonant circuit of the first input unit. Reference numeral 1231 denotes the voltage of the resonant circuit, when the signal 1221 is transmitted. Reference numeral 1232 denotes the voltage of the resonant circuit, when the signal 1222 is transmitted. The resonant circuit voltages 1231 and 1232 may decrease over time.

Reference numeral 1250 denotes a signal transmitted and received between the user device and the first input unit. For example, if the first input unit is identified, the user device transmits at least one signal to activate the IC of the first input unit during an activation interval 1251 and transmits and receives data to and from the first input unit during first to fourth data intervals 1252, 1253, 1254, and 1255.

Referring to FIG. 12C, if the input unit is identified as a second input unit at operation S1122, the user device 100 transmits at least one signal 1270 in predetermined time slots 1260 to the second input unit. Among the predetermined time slots 1260, the pen recognition panel receives a signal from the input unit in R time slots 1262 and the user device transmits energy in an EM field to the input unit in T time slots 1261 and 1263. To activate the IC of the second input unit, the user device continuously transmits a signal 1271 during a predetermined time period 1261. The user device may periodically alternate between reception and transmission in the time slots 1262 and 1263. Reference numeral 1270 denotes the period, duration, or voltage of a transmitted signal. The signals 1271 and 1272 correspond to the time slots 1261 and 1263.

Reference numeral 1280 denotes a variation in the voltage of the resonant circuit of the second input unit. Reference numeral 1281 denotes the voltage of the resonant circuit when the signal 1271 is transmitted, and reference numeral 1282 denotes the voltage of the resonant circuit when the signal 1272 is transmitted. These voltages 1281 and 1282 may decrease over time. The second input unit may be charged with energy received from the user device in the T time slots 1263 and transmit a signal to the user device through the resonant circuit in the R time slots 1262. A signal strength may vary with the distance to the input unit and a voltage. The controller of the input unit may switch on or off the switch 623 of FIG. 6 and may or may not transmit a signal to the user device according to the on or off of the switch 623. Accordingly, digital information 0 or 1 may be transmitted to the user device.

Reference numeral 1290 denotes the characteristics of signals transmitted between the user device and the input unit. For example, at least one signal for activating the IC of the input unit is transmitted during an activation interval 1291. During the activation interval 1291, energy to be provided to the controller of the input unit may be accumulated in the power source 610 and the controller may acquire a pen pressure value through the variable capacitor 640. Data is transmitted and received between the user device and the second input unit during first and second data intervals 1292 and 1293.

Upon receipt of a signal 1270 illustrated in FIG. 12C from the user device, the second input unit activates the IC based on the received signal and charges a power source including a battery or a capacitor. A resonant signal is generated using the received energy. In this manner, the user device may transmit the signal for activating the IC of the second input unit continuously during a predetermined time period and may transmit a signal periodically at every predetermined interval after the predetermined time period. The input unit is charged with the signal received from the user device and transmits a feedback signal for the received signal to the user device. The feedback signal may include information about the pressure of the pen point of the input unit and the coordinates of the position of the input unit. The feedback signal may further include identification information about the input unit as well as button information of the input unit. According to various embodiments of the present disclosure, the transmission and reception period of a signal may be different depending on the type of the input unit.

Figure 13:
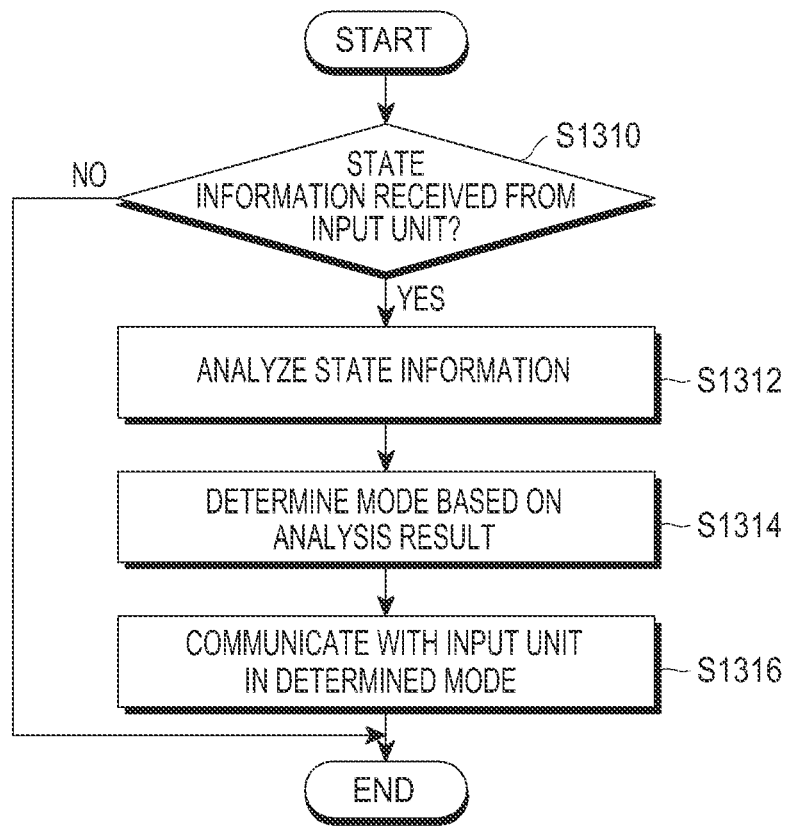
FIG. 13 illustrates an operation for receiving state information from an input unit and for determining a mode for a digitizer based on the received state information in a user device according to various embodiments of the present disclosure.

FIG. 13 illustrates an operation for receiving state information from an input unit and for determining a mode for a digitizer in a user device according to various embodiments of the present disclosure.

According to various embodiments of the present disclosure, an input unit includes, for example, a resonant circuit, an IC, and a memory. Further, the input unit may have a power source or a battery chargeable with a signal or a magnetic field received from a user device. The input unit may include a digital device capable of conducting short-range communication and reading text in addition to the resonant circuit, the IC, and the memory. In comparison to a passive input unit to which power is not supplied, the input unit may have good performance. In addition, the input unit may use more power than the passive input unit, thus being favorable in terms of power management. The input unit may transmit information about the ID and position of the input unit to the user device. Depending on a purpose and a device that the input unit serves, the input unit may include various types of digital devices and may transmit state information about the input unit (e.g., information indicating the type of the input unit) to the user device.

With reference to FIG. 13, a method for receiving state information from an input unit and for determining an operation mode of a digitizer based on the state information by a user device according to various embodiments of the present disclosure will be described below.

Referring to FIG. 13, at operation S1310, the user device determines whether state information is received from an input unit.

If the user device determines that state information is not received from the input unit at operation S1310, then the user device may end the method for receiving state information from an input unit and for determining a mode for a digitizer based on the received state information.

In contrast, if the user device determines that state information is received from the input unit at operation S1310, then, upon receipt of state information from the input unit, the user device proceeds to operation S1312 at which the user device analyzes the received state information. The state information may specify the ID and type of the input unit. According to various embodiments of the present disclosure, the user device may receive various data from the input unit. Different data may be received from different types of input units. For example, if the input unit is a lollol pen, information about text read by the lollol pen may be transmitted to the user device.

At operation S1314, the operation mode of the pen recognition panel is determined based on the analysis result. For example, the operation mode of the pen recognition panel is determined based on the analysis of the state information. Once the type of the input is determined, the mode of the pen recognition panel is determined to process data received from the input unit and the pen recognition panel is operated in the determined mode. According to various embodiments of the present disclosure, operation modes of the pen recognition module may include a first mode of conducting short-range communication, a second mode of conducting both short-range communication and electromagnetic communication, and a third mode of conducting electromagnetic communication. The pen recognition panel may communicate with the input unit by short-range communication in the first mode, may perform the first-mode operation and detect at least one of a touch and hovering of the input unit in the second mode, and may detect at least one of a touch and hovering of the input unit in the third mode.

According to various embodiments of the present disclosure, the input unit may transmit the coordinates or position information of the input unit to the user device. In this case, the user device may scan the pen recognition panel on a predetermined area unit basis instead of fully scanning the pen recognition panel. If the input unit may transmit and receive a signal to and from the user device in an electromagnetic manner, the user device may discontinue data transmission and reception by short-range communication.

At operation S1316, the user device communicates with the input unit by operating the pen recognition panel in the mode determined at operation S1314. Once the mode of the pen recognition panel is determined, data received from the input unit is processed in the determined mode and displayed on the pen recognition panel.

As is apparent from the above description of the various embodiments of the present disclosure, because a method for switching the mode of a digitizer and a user device according to the distance between an input unit and the digitizer is provided, energy efficiency and user convenience can be increased.

Because a method for switching the mode of a digitizer and a user device according to the state of an input unit is provided, energy efficiency and user convenience can be increased.

Because a method for switching the mode of a digitizer and a user device according to the type of an input unit is provided, energy efficiency can be increased and various use experiences can be provided.

It will be understood that the various embodiments of the present disclosure can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g., a computer), such as a CD, a DVD, a magnetic disk, or a magnetic tape. Further, the various embodiments of the present disclosure can be implemented in a computer or portable terminal that has a controller and a memory, and the memory is an example of a non-transitory machine-readable storage medium suitable for storing a program or programs including commands to implement the various embodiments of the present disclosure. Accordingly, various embodiments of the present disclosure include a program having a code for implementing the apparatuses or methods defined by the claims and a non-transitory storage medium readable by a machine that stores the program. The program can be transferred electronically through a medium such as a communication signal transmitted via a wired or wireless connection, which and the equivalents of which are included in the present disclosure.

The user device can receive the program from a program providing device connected by cable or wirelessly and store it. The program providing device may include a program including commands to implement the various embodiments of the present disclosure, a memory for storing information required for the various embodiments of the present disclosure, a communication module for communicating with the mobile device by cable or wirelessly, and a controller for transmitting the program to the user device automatically or upon request of the user device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a mode of a digitizer in an electronic device, the method comprising:
    transmitting, by the electronic device, at least one signal to an input unit;
    detecting, by the electronic device, the input unit based on a feedback signal received in response to the transmitted at least one signal;
    measuring, by the electronic device, at least one parameter corresponding to the input unit based on the received feedback signal;
    determining, by the electronic device, a type of the input unit using the at least one parameter;
    determining, by the electronic device, a distance between the electronic device and the input unit; and
    switching, by the electronic device, the digitizer to a mode according to the determined type of the input unit and the determined distance,
    wherein the switching of the digitizer comprises switching the digitizer to a passive mode, if the determined distance is larger than a distance threshold.

2. The method of claim 1, wherein the measuring of the at least one parameter comprises comparing the at least one parameter with a threshold.

3. The method of claim 1, wherein the measuring of the at least one parameter comprises comparing a voltage at an area corresponding to the input unit with a threshold.

4. The method of claim 1, wherein the controlling of switching of the digitizer comprises switching the digitizer from a scanning mode to at least one of the passive mode and a digital mode based on the at least one parameter.

5. The method of claim 4, wherein the controlling of switching of the digitizer comprises switching the digitizer to the passive mode, if a voltage at an area corresponding to the input unit is smaller than a voltage threshold.

6. The method of claim 4, wherein the controlling of switching of the digitizer comprises switching the digitizer to the digital mode, if a voltage at an area corresponding to the input unit is equal to or larger than a voltage threshold, or if the determined distance is equal to or smaller than the distance threshold.

7. The method of claim 1, wherein the measuring of the at least one parameter comprises:
    comparing a threshold with at least one of a strength of the feedback signal received from the input unit, a phase of the feedback signal, a variation in the strength of the feedback signal over time, or a variation in the phase of the feedback signal over time; or
    measuring the at least one parameter based on at least one of the feedback signal, reception or non-reception of the feedback signal, reception or non-reception of the feedback signal over time, a digital communication value included in the feedback signal, or state information about the input unit.

8. The method of claim 1, wherein if the digitizer is switched to the passive mode according to the input unit, the controlling comprises receiving an analog signal from the input unit.

9. The method of claim 1, wherein if the digitizer is switched to a digital mode according to the input unit, the controlling of switching of the digitizer comprises performing at least one of digital communication with the input unit or transmission of a signal to activate an Integrated Circuit (IC) of the input unit.

10. The method of claim 1, wherein if the digitizer is switched to a digital mode according to the input unit, the controlling of switching of the digitizer comprises further classifying the digital mode into a plurality of modes according to the determined distance.

11. The method of claim 10, wherein the plurality of modes includes a first mode in which either a hovering or a touch of the input unit is not detected, a second mode in which a hovering of the input unit is detected, and a third mode in which a touch of the input unit is detected.

12. The method of claim 11, wherein a signal transmitted and received between the input unit and the electronic device in at least one of the first, second, and third modes includes at least one of a signal for supplying power to the input unit, a signal for detecting a touch of the input unit, a signal for detecting an input of a button in the input unit, an Identifier (ID) of the input unit, or (X, Y) coordinates of the input unit.

13. The method of claim 1, wherein if the digitizer is switched to a digital mode according to the input unit, the controlling of switching of the digitizer comprises determining whether the input unit has a battery.

14. The method of claim 13, wherein if the digitizer is switched to the digital mode according to the input unit, the digital mode is divided into a passive digital mode and an active digital mode according to the presence or absence of a power source that drives an Integrated Circuit (IC) of the input unit.

15. The method of claim 14, wherein the dividing of the digital mode into a passive digital mode and an active digital mode comprises determining the presence or absence of a power source in the input unit based on the feedback signal received from the input unit.

16. A non-transitory computer-readable storage medium storing instructions that, when executed, cause at least one processor to perform the method of claim 1.

17. An electronic device for controlling a mode of a digitizer, the electronic device comprising:
    the digitizer;
    a transceiver; and
    at least one processor configured to:
        control the transceiver to transmit at least one signal to an input unit,
        detect the input unit based on a feedback signal received in response to the transmitted at least one signal,
        measure at least one parameter corresponding to the input unit based on the received feedback signal,
        determine a type of the input unit using the at least one parameter,
        determine a distance between the electronic device and the input unit, and
        switch the digitizer to a mode according to the determined type of the input unit and the determined distance,
    wherein, to switch the digitizer, the at least processor is further configured to switch the digitizer to a passive mode, if the determined distance is larger than a distance threshold.

18. The electronic device of claim 17, wherein the at least one processor is further configured to compare the at least one parameter with a threshold.

19. The electronic device of claim 17, wherein the at least one processor is further configured to switch the digitizer from a scanning mode to at least one of the passive mode and a digital mode based on the at least one parameter.

20. The electronic device of claim 17, wherein if the digitizer is switched to a digital mode according to the input unit, the at least one processor is further configured to control the transceiver to perform at least one of digital communication with the input unit or transmission of a signal to activate an Integrated Circuit (IC) of the input unit.

21. The electronic device of claim 20, wherein if the digitizer is switched to the digital mode according to the input unit, the at least one processor is further configured to determine whether the input unit has a battery by analyzing a feedback signal received from the input unit and switches the digitizer to a passive digital mode or an active digital mode according to the presence or absence of the battery.

22. The electronic device of claim 17, wherein the input unit is a digital input unit that receives power activating an Integrated Circuit (IC) of the input unit.

23. The electronic device of claim 17, wherein if the input unit is a passive input unit, the at least one processor is further configured to switch the digitizer to the passive mode.

24. A method for controlling a mode of a digitizer in an electronic device, the method comprising:

receiving, by the electronic device, a feedback signal from an input unit having a communication function after the electronic device transmits a signal to the input unit;

determining, by the electronic device, a distance between the electronic device and the input unit;

determining, by the electronic device, a type of the input unit using at least one parameter measured based on the received feedback signal;

determining, by the electronic device, an operation mode of the digitizer based on the determined distance and the determined type of the input unit;

communicating, by the electronic device, with the input unit in the determined operation mode of the digitizer; and switching the digitizer to a passive mode, if the determined distance is larger than a distance threshold.

25. The method of claim 24, the method further comprising:

scanning the digitizer to generate the signal to transmit to the input unit.

26. The method of claim 24, wherein if the received feedback signal includes information about an area corresponding to the input unit, the receiving of the feedback signal from the input unit comprises scanning a partial area of the digitizer corresponding to the information.

27. A non-transitory computer-readable storage medium storing instructions that, when executed, cause at least one processor to perform the method of claim 24.

* * * * *